(12) United States Patent
Dong et al.

(10) Patent No.: US 10,142,808 B2
(45) Date of Patent: Nov. 27, 2018

(54) FLOOR CONTROL METHOD AND APPARATUS

(71) Applicant: Huawei Technologies Co., Ltd., Shenzhen (CN)

(72) Inventors: Ying Dong, Shenzhen (CN); Shaofeng Liu, Shanghai (CN); Haiyue Li, Xi'an (CN); Xiaobin Yang, Brussels (BE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 15/639,772

(22) Filed: Jun. 30, 2017

(65) Prior Publication Data

US 2017/0303102 A1 Oct. 19, 2017

Related U.S. Application Data

(63) Continuation of application No. PCT/CN2014/095641, filed on Dec. 30, 2014.

(51) Int. Cl.
*H04B 1/00* (2006.01)
*H04W 4/12* (2009.01)
(Continued)

(52) U.S. Cl.
CPC ........... *H04W 4/12* (2013.01); *H04L 65/4061* (2013.01); *H04W 4/10* (2013.01); *H04W 76/45* (2018.02);
(Continued)

(58) Field of Classification Search
CPC ......... H04W 4/12; H04W 76/45; H04W 4/10; H04L 65/4061; H04L 65/1016; H04L 65/103; H04L 65/4038
See application file for complete search history.

(56) References Cited

U.S. PATENT DOCUMENTS

| 7,688,764 B2* | 3/2010 | Dorenbosch | H04L 29/06 370/260 |
| 8,184,795 B2* | 5/2012 | Keller | H04W 72/005 379/211.02 |

(Continued)

FOREIGN PATENT DOCUMENTS

| CN | 1890996 A | 1/2007 |
| CN | 1897720 A | 1/2007 |

(Continued)

OTHER PUBLICATIONS

"3rd Generation Partnership Project; Technical Specification Group Services and System Aspects; Multimedia Broadcast/Multicast Service (MBMS); Architecture and Functional Description (Release 12)," 3GPP TS 23.246 V12A.0, Dec. 2014, 67 pages.

(Continued)

*Primary Examiner* — Dominic E Rego
(74) *Attorney, Agent, or Firm* — Slater Matsil, LLP

(57) ABSTRACT

A floor control apparatus and method, the method including receiving, by a media resource function entity, a first floor application message sent by UE, generating, by the media resource function entity, a second floor application message according to the first floor application message, sending, by the media resource function entity, the second floor application message to a mission-critical push-to-talk (MCPTT) server, receiving, by the media resource function entity, a first floor grant message that is in response to the second floor application message and that is sent by the MCPTT server, generating, by the media resource function entity, a second floor grant message according to the first floor grant message, and sending, by the media resource function entity, the second floor grant message to the UE.

18 Claims, 10 Drawing Sheets

(51) Int. Cl.
*H04W 4/10* (2009.01)
*H04W 76/45* (2018.01)
*H04L 29/06* (2006.01)

(52) U.S. Cl.
CPC ........ *H04L 65/103* (2013.01); *H04L 65/1016* (2013.01); *H04L 65/4038* (2013.01)

(56) References Cited

U.S. PATENT DOCUMENTS

| | | | |
|---|---|---|---|
| 2005/0124365 A1 | 6/2005 | Balasuriya et al. | |
| 2006/0031294 A1* | 2/2006 | Poikselka | H04W 76/45 709/204 |
| 2006/0171351 A1* | 8/2006 | Wild | H04M 3/42221 370/328 |
| 2006/0265451 A1* | 11/2006 | Tomimori | H04L 63/104 709/204 |
| 2007/0019645 A1* | 1/2007 | Menon | H04L 12/1818 370/390 |
| 2008/0098063 A1 | 4/2008 | Huh et al. | |
| 2009/0005100 A1* | 1/2009 | Copeland | H04L 65/4061 455/518 |
| 2009/0080356 A1 | 3/2009 | Song et al. | |
| 2011/0165905 A1* | 7/2011 | Shuman | H04W 4/02 455/518 |
| 2013/0059622 A1* | 3/2013 | Agulnik | H04W 4/08 455/518 |
| 2013/0155875 A1 | 6/2013 | Ayyasamy et al. | |
| 2014/0050088 A1 | 2/2014 | Song | |
| 2014/0355508 A1* | 12/2014 | Anchan | H04W 4/10 370/312 |

FOREIGN PATENT DOCUMENTS

| | | |
|---|---|---|
| CN | 101729995 A | 6/2010 |
| EP | 2018011 A1 | 1/2009 |
| RU | 2466504 C2 | 11/2012 |
| RU | 2469501 C2 | 12/2012 |
| RU | 2011140526 A | 4/2013 |

OTHER PUBLICATIONS

"PoC User Plane," Draft Version 2.0, Open Mobile Alliance, OMA-TS_PoC-UserPlane-V2_0-D, Jun. 19, 2006, 179 pages.

"Push to talk over Cellular (PoC)—Architecture," Draft Version 2.0-24, Open Mobile Alliance, OMA-AD_PoC-V2_0-20060524-D, May 2006, 55 pages.

"High Level MCPTT Architecture," Source: Vodafone, Nokia Networks, BlackBerry UK Ltd., Document for: Approval, Agenda Item: 7.4.1, Work Item / Release: MCPTT / R'13, SA WG2 Meeting #105, S2-143806, rev of S2-143735, Sapporo, Japan, Oct. 13-17, 2014, 5 pages.

"PoC User Plane," Open Mobile Alliance OMA-TS-PoC_UserPlane-V2_1-20110802-A, Aug. 2, 2011, 378 pages.

"3rd Generation Partnership Project; Technical Specification Group Services and System Aspects; Study on Architectural Enhancements to Support Mission Critical Push to Talk Over LTE (MCPTT) Services (Release 13)," 3GPP TR 23.779 V0.4.0, Nov. 2014, 32 pages.

"3rd Generation Partnership Project;Technical Specification Group Services and System Aspects; Study on Application Architectural to Support Mission Critical Push to Talk over LTE (MCPTT) Services (Release 13)," 3GPP TR 23.779 V0.5.0, Jan. 2015, 92 pages.

"Architecture Considerations for Floor Control," Source: TD Tech, Huawei, Hisilicon, Document for: Discussion & Approval, Agenda Item: 8.7, Work Item/Release: MCPTT/Release 13, 3GPP TSG-SA WG6 Meeting #1, S6-150042, Jan. 2015, 4 pages.

Schulzrinne, H. et al.,"RTP: A Transport Protocol for Real-Time Applications," Network Working Group, Request for Comments: 3550, Obsoletes: 1889, Category: Standards Track, Jul. 2003, 106 pages.

Camarillo, G., "Session Description Protocol (SDP) Format for Binary Floor Control Protocol (BFCP) Streams," Network Working Group, Request for Comments: 4583, Category: Standards Track, Nov. 2006, 12 pages.

* cited by examiner

FLOOR CONTROL METHOD AND APPARATUS

CROSS-REFERENCE TO RELATED APPLICATIONS

This application is a continuation of International Application No. PCT/CN2014/095641, filed on Dec. 30, 2014, the disclosure of which is hereby incorporated by reference in its entirety.

TECHNICAL FIELD

The present invention relates to the communications field, and in particular, to a floor control method and apparatus.

BACKGROUND

Push-to-Talk over Cellular (PoC) is a Push-to-Talk (PTT) service in a public cellular mobile communications network. The PTT service implements a mobile voice service of a walkie-talkie, and has the following advantages: a call set-up time is short, a channel is occupied only when a user talks, only a channel is listened to when a call is answered, and a receiver can receive call information at any time without off-hook.

The PoC is a two-way, instant, and multi-party communication manner, and allows two or more user equipments to communicate with each other. A user can press a key to send a voice to all participants of a session.

In an existing PoC service solution, a floor control solution is that floor information is reported by using the Real-Time Transport Control Protocol (RTCP) and by using a dedicated unicast connection of user equipment. However, in a PoC architecture, both signaling on a control plane and a bearing on a media plane are implemented in a PoC server PoC Server, and the control plane and the media plane are not separated. This causes difficulty in subsequent technology evolution and is not conducive to either flexible implementation of services or system extension. In the prior art, there is no detailed floor control procedure after the control plane and the media plane are separated.

SUMMARY

Embodiments of the present invention provide a floor control method and apparatus, so as to resolve a prior-art problem: A control plane and a media plane of a PoC service are not separated, and this causes difficulty in subsequent technology evolution and is not conducive to either flexible implementation of services or system extension; and there is no detailed floor control procedure after the control plane and the media plane are separated.

According to a first aspect of the present invention, a floor control method is provided, where the method includes receiving, by a media resource function Media Resource Function entity, a first floor application message sent by user equipment (UE), where the first floor application message includes an identity of a talker, an identifier of a group to which the talker belongs, and a parameter indicating that an event type is a floor request, generating, by the media resource function entity, a second floor application message according to the first floor application message, where the second floor application message includes the identity of the talker, the identifier of the group to which the talker belongs, and the parameter indicating that an event type is a floor request, sending, by the media resource function entity, the second floor application message to a mission-critical push-to-talk (MCPTT) server over Long Term Evolution network, receiving, by the media resource function entity, a first floor grant message that is in response to the second floor application message and that is sent by the MCPTT server, where the first floor grant message includes the identity of the talker, the identifier of the group to which the talker belongs, and a parameter indicating that an event type is a floor grant, generating, by the media resource function entity, a second floor grant message according to the first floor grant message, where the second floor grant message includes the identity of the talker, the identifier of the group to which the talker belongs, and the parameter indicating that an event type is a floor grant, and sending, by the media resource function entity, the second floor grant message to the UE.

According to a second aspect of the present invention, a floor control apparatus is provided, where the apparatus includes, a first receiver, configured to receive a first floor application message sent by user equipment UE, where the first floor application message includes an identity of a talker, an identifier of a group to which the talker belongs, and a parameter indicating that an event type is a floor request, a first generator, configured to generate a second floor application message according to the first floor application message received by the first receiver, where the second floor application message includes the identity of the talker, the identifier of the group to which the talker belongs, and the parameter indicating that the event type is a floor request, and a first transmitter, configured to send, to a mission-critical push-to-talk (MCPTT) server over Long Term Evolution (LTE) network, the second floor application message generated by the first generator, where the first receiver is further configured to receive a first floor grant message that is in response to the second floor application message and that is sent by the MCPTT server, where the first floor grant message includes the identity of the talker, the identifier of the group to which the talker belongs, and a parameter indicating that an event type is a floor grant. The first generator is further configured to generate a second floor grant message according to the first floor grant message, where the second floor grant message includes the identity of the talker, the identifier of the group to which the talker belongs, and the parameter indicating that an event type is a floor grant, and the first transmitter is further configured to send, to the UE, the second floor grant message generated by the first generator.

According to a third aspect of the present invention, a floor control method is provided, where the method includes receiving, by a media resource function Media Resource Function entity, a first floor application message sent by user equipment UE, where the first floor application message includes an identity of a talker, an identifier of a group to which the talker belongs, and a parameter indicating that an event type is a floor request, generating, by the media resource function entity, a second floor application message according to the first floor application message, where the second floor application message includes the identity of the talker, the identifier of the group to which the talker belongs, and the parameter indicating that the event type is a floor request, sending, by the media resource function entity, the second floor application message to a mission-critical push-to-talk MCPTT server over Long Term Evolution network, receiving, by the media resource function entity, a first floor deny message that is in response to the second floor application message and that is sent by the MCPTT server, where the first floor deny message includes the identity of the talker, the identifier of the group to which the talker belongs, a parameter indicating that an event type is floor deny, and a deny cause value, generating, by the media resource function entity, a second floor deny message according to the first floor deny message, where the second floor deny message includes the identity of the talker, the identifier of the group to which the talker belongs, the parameter indicating that an event type is floor deny, and the deny cause value, and sending, by the media resource function entity, the second floor deny message to the UE.

According to a fourth aspect of the present invention, a floor control apparatus is provided, where the apparatus includes a second receiver, configured to receive a first floor application message sent by user equipment UE, where the first floor application message includes an identity of a talker, an identifier of a group to which the talker belongs, and a parameter indicating that an event type is a floor request, a second generator, configured to generate a second floor application message according to the first floor application message received by the second receiver, where the second floor application message includes the identity of the talker, the identifier of the group to which the UE belongs, and the parameter indicating that the event type is a floor request, and a second transmitter, configured to send, to a mission-critical push-to-talk MCPTT server over Long Term Evolution network, the second floor application message generated by the second generator. The second receiver is further configured to receive a first floor deny message that is in response to the second floor application message and that is sent by the MCPTT server, where the first floor deny message includes the identity of the talker, the identifier of the group to which the UE belongs, a parameter indicating that an event type is floor deny, and a deny cause value, the second generator is further configured to generate a second floor deny message according to the first floor deny message received by the second receiver, where the second floor deny message includes the identity of the talker, the identifier of the group to which the UE belongs, the parameter indicating that an event type is floor deny, and the deny cause value, and the second transmitter is further configured to send, to the UE, the second floor deny message generated by the second generator.

According to a fifth aspect of the present invention, a floor control method is provided, where the method includes receiving, by a mission-critical push-to-talk MCPTT server over Long Term Evolution network, a second floor application message sent by a media resource function entity, where the second floor application message includes an identity of a talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request determining, by the MCPTT server according to a floor control policy and the second floor application message, to grant the talker a floor, and generating, according to the second floor application message, a first floor grant message in response to the second floor application message, where the first floor grant message includes the identity of the talker, the identifier of the group to which the talker belongs, and a parameter indicating that an event type is a floor grant, and sending, by the MCPTT server, the first floor grant message to the media resource function entity, where the first floor grant message is used to instruct the media resource function entity to generate a second floor grant message, and send the second floor grant message to the UE, and the second floor grant message includes the identity of the talker, the identifier of the group to which the talker belongs, and the parameter indicating that an event type is a floor grant.

According to a sixth aspect of the present invention, a floor control apparatus is provided, where the apparatus includes, a third receiver, configured to receive a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request, a first determining and generation module, configured to: determine, according to a floor control policy and the second floor application message, to grant the talker a floor, and generate, according to the second floor application message, a first floor grant message in response to the second floor application message, where the first floor grant message includes the identity of the talker, the identifier of the group to which the talker belongs, and a parameter indicating that an event type is a floor grant, and a third transmitter, configured to send the first floor grant message to the media resource function entity, where the first floor grant message is used to instruct the media resource function entity to generate a second floor grant message, and send the second floor grant message to the UE, and the second floor grant message includes the identity of the talker, the identifier of the group to which the talker belongs, and the parameter indicating that an event type is a floor grant.

According to a seventh aspect of the present invention, a floor control method is provided, where the method includes receiving, by a mission-critical push-to-talk MCPTT server over Long Term Evolution network, a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request, generating, by the MCPTT server, a first floor deny message according to the second floor application message and a floor control policy, where the first floor deny message includes the identity of the talker, the identifier of the group to which the talker belongs, a parameter indicating that an event type is floor deny, and a deny cause value, and sending, by the MCPTT server, the first floor deny message to the media resource function entity, where the first floor deny message is used to instruct the media resource function entity to generate a second floor deny message according to the first floor deny message, and send the second floor deny message to the UE, and the second floor deny message includes the identity of the talker, the identifier of the group to which the talker belongs, the parameter indicating that an event type is floor deny, and the deny cause value.

According to an eighth aspect of the present invention, a floor control apparatus is provided, where the apparatus includes a fourth receiver, configured to receive a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request, a fourth generator, configured to generate a first floor deny message according to the second floor application message and a floor control policy, where the first floor deny message includes the identity of the talker, the identifier of the group to which the talker belongs, a parameter indicating that an event type is floor deny, and a deny cause value, and a fourth transmitter, configured to send the first floor deny message to the media resource function entity, where the first floor deny message is used to instruct the media resource function entity to generate a second floor deny message according to the first floor deny message, and send the second floor deny message to the UE, and the second floor deny message includes the identity of the talker, the identifier of the group to which the talker belongs, the parameter indicating that an event type is floor deny, and the deny cause value.

According to the floor control method provided in the embodiments of the present invention, a control plane and a media plane of a PTT service can be separated, and transmission information on a control plane for floor control and a floor control (including: floor application, floor deny, floor release, remaining floor duration notification, and floor information notification by using a multicast channel) procedure method are defined. This helps a control plane function entity and a media plane function entity to separately perform subsequent technology evolution. In addition, configuration can be flexibly performed at a service layer, and a service feature can be flexibly defined, so that a service is flexibly implemented. This also helps system extension. Moreover, compared with a unicast notification manner in the prior art, other user equipment in a group, except user equipment that has obtained a floor, is notified of floor change information in a broadcast multicast manner. In this way, a delay is shorter, and user experience is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 12 is a structural diagram of an MCPTT server according to an embodiment of;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The following embodiments may be applied to a fourth-generation network such as an LTE (Long Term Evolution, Long Term Evolution) network, may be applied to a third-generation network such as a Universal Mobile Telecommunications System (UMTS) network or a Code Division Multiple Access 2000 (CDMA 2000) network, or may be applied to a second-generation network such as a Code Division Multiple Access (CDMA) network or a Global System for Mobile Communications (GSM) network.

Figure 1:
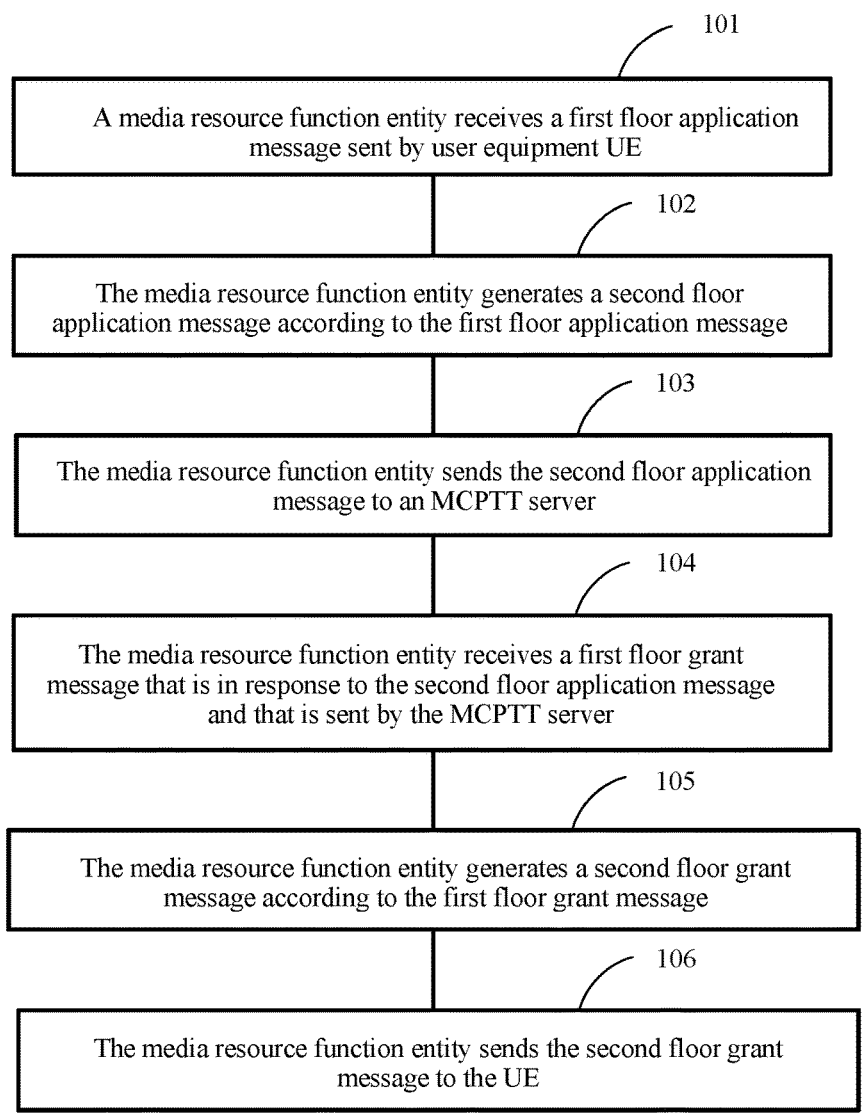
FIG. 1 is a flowchart 1 of a floor control method according to an embodiment.

Embodiment 1 of the present invention is described in detail in the following by using FIG. 1 as an example. This embodiment of the present invention provides a floor control method, the method is specifically a successful floor application procedure, and the method includes the following steps:

Step 101: A media resource function (Media Resource Function) entity receives a first floor application message sent by user equipment UE, where the first floor application message includes an identity of a talker, an identifier of a group to which the talker belongs, and a parameter indicating that an event type is a floor request. Optionally, the first floor application message may be a floor request message in the Real-Time Control Protocol (RTCP) protocol.

Step 102: The media resource function entity generates a second floor application message according to the first floor application message, where the second floor application message includes the identity of the talker, the identifier of the group to which the talker belongs, and the parameter indicating that the event type is a floor request. Optionally, the second floor application message may be a floor request message in the Real-Time Control Protocol (RTCP) protocol.

Step 103: The media resource function entity sends the second floor application message to a mission-critical push-to-talk MCPTT server over Long Term Evolution network.

Step 104: The media resource function entity receives a first floor grant message that is in response to the second floor application message and that is sent by the MCPTT server, where the first floor grant message includes the identity of the talker, the identifier of the group to which the talker belongs, and a parameter indicating that an event type is a floor grant.

Step 105: The media resource function entity generates a second floor grant message according to the first floor grant message, where the second floor grant message includes the identity of the talker, the identifier of the group to which the talker belongs, and the parameter indicating that an event type is a floor grant.

Step 106: The media resource function entity sends the second floor grant message to the UE.

Figure 2:
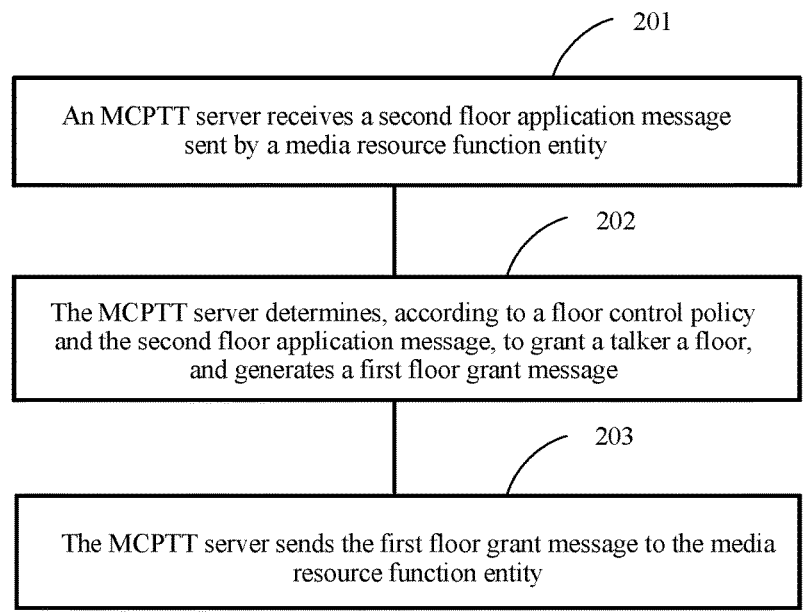
FIG. 2 is a flowchart 2 of another floor control method according to an embodiment.

Embodiment 2 of the present invention is described in detail in the following by using FIG. 2 as an example. This embodiment of the present invention provides a floor control method, the method is specifically a successful floor application procedure, and the method includes the following steps.

Step 201: A mission-critical push-to-talk (MCPTT) server over LTE (Long Term Evolution network) receives a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request.

Step 202: The MCPTT server determines, according to a floor control policy and the second floor application message, to grant the talker a floor, and generates, according to the second floor application message, a first floor grant message in response to the second floor application message, where the first floor grant message includes the identity of the talker, the identifier of the group to which the talker belongs, and a parameter indicating that an event type is a floor grant.

The floor control policy includes at least one of a status of the group to which the talker belongs, a user priority, a user floor control right, or a current floor queue status.

That it is determined, according to the user priority, to grant the talker the floor may be, if it is determined that a user priority of the talker is higher than that of a current floor holder or meets a floor grant standard, the floor is granted to the talker.

That it is determined, according to the user floor control right, to grant the talker the floor may be, if it is determined that the talker has a user floor right, the floor is granted to the talker.

That it is determined, according to the status of the group to which the talker belongs, to grant the talker the floor may be whether currently there is a user in the group who holds the floor is checked. If currently there is a floor holder, there is a need to grant the talker the floor after it is determined that a user priority of the talker is higher than that of the current floor holder and that the talker has a user floor right (for example, the talker is not in a blacklist); or if currently there is no floor holder, the floor is granted to the talker after it is determined that the talker has a user floor right (for example, the talker is not in a blacklist).

That it is determined, according to the current floor queue status, to grant the talker the floor may be, if it is determined, according to a priority of the talker, that there is no need to perform floor priority queuing, it is determined to grant the talker the floor; or if it is determined, according to a priority of the talker, that there is a need to perform floor priority queuing, it is determined to grant the talker the floor after the talker queues for a period of time.

Step 203: The MCPTT server sends the first floor grant message to the media resource function entity, where the first floor grant message is used to instruct the media resource function entity to generate a second floor grant message, and send the second floor grant message to the UE, and the second floor grant message includes the identity of the talker, the identifier of the group to which the talker belongs, and the parameter indicating that an event type is a floor grant.

A same floor grant procedure is described in the foregoing Embodiments 1 and 2 respectively from a perspective of the media resource function entity and from a perspective of the MCPTT server, and features in the foregoing Embodiments 1 and 2 may be mutually referenced. In addition, for other more detailed content of the floor grant procedure, refer to Embodiment 3 of the present invention.

Figure 3:
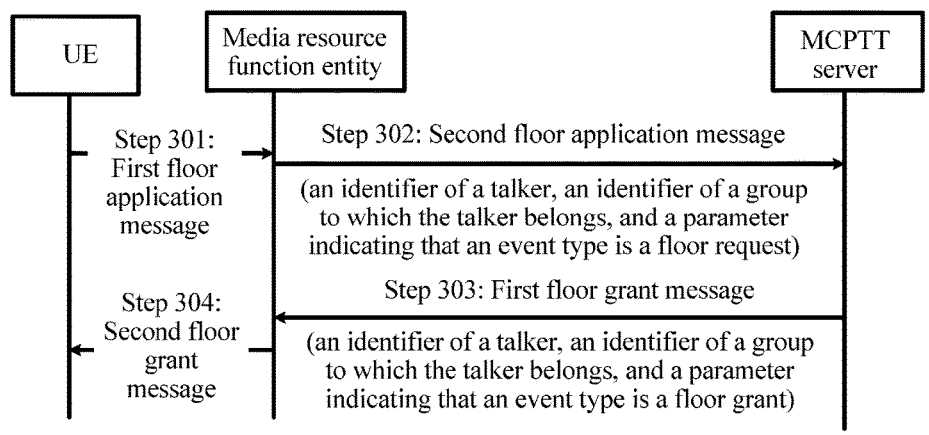
FIG. 3 is a flowchart 3 of another floor control method according to an embodiment.

Embodiment 3 of the present invention is described in detail in the following by using FIG. 3 as an example. This embodiment of the present invention provides a floor control method, the method is specifically a successful floor application procedure, and the method includes the following steps.

Step 301: A talker presses a PTT key of user equipment user equipment (UE), and the UE sends a first floor application message to a media resource function (Media Resource Function) entity, where the first floor application message includes an identity of the talker (talker ID), an identifier of a group (Group ID) to which the talker belongs, and a parameter indicating that an event type is a floor request (floor request). Optionally, a message type of the first floor application message may be a floor request message in the Real-Time Control Protocol (RTCP) protocol.

Step 302: The media resource function entity generates a second floor application message according to the first floor application message, where the second floor application message includes the identity of the talker (talker ID), the identifier of the group (group ID) to which the talker belongs, and the parameter indicating that the event type is a floor request (floor request); and then, the media resource function entity sends the second floor application message to an MCPTT server.

Optionally, a message type of the second floor application message may be a floor request message in the RTCP.

Step 303: The MCPTT server receives the second floor application message, and determines, according to the second floor application message and a floor control policy, to grant the talker a floor; the MCPTT server generates, according to the second floor application message, a first floor grant message in response to the second floor application message, where the first floor grant message includes the identity of the talker, the identifier of the group to which the talker belongs, and a parameter indicating that an event type is a floor grant (floor grant); and the MCPTT server sends the first floor grant message to the media resource function entity.

Optionally, a message type of the first floor grant message may be a floor grant message in the RTCP.

The floor control policy includes at least one of a status of the group to which the talker belongs, a user priority, a user floor control right, or a current floor queue status.

That it is determined, according to the user priority, to grant the talker the floor may be, if it is determined that a user priority of the talker is higher than that of a current floor holder or meets a floor grant standard, the floor is granted to the talker.

That it is determined, according to the user floor control right, to grant the talker the floor may be, if it is determined that the talker has a user floor right, the floor is granted to the talker.

That it is determined, according to the status of the group to which the talker belongs, to grant the talker the floor may be whether currently there is a user in the group who holds the floor is checked; if currently there is a floor holder, there is a need to grant the talker the floor after it is determined that a user priority of the talker is higher than that of the current floor holder and that the talker has a user floor right (for example, the talker is not in a blacklist); or if currently there is no floor holder, the floor is granted to the talker after it is determined that the talker has a user floor right (for example, the talker is not in a blacklist).

That it is determined, according to the current floor queue status, to grant the talker the floor may be, if it is determined, according to a priority of the talker, that there is no need to perform floor priority queuing, it is determined to grant the talker the floor; or if it is determined, according to a priority of the talker, that there is a need to perform floor priority queuing, it is determined to grant the talker the floor after the talker queues for a period of time.

Step 304: The media resource function entity receives the first floor grant message, and generates a second floor grant message according to the first floor grant message, where the second floor grant message includes the identity of the talker, the identifier of the group to which the talker belongs, and the parameter indicating that an event type is a floor grant; the media resource function entity sends the second floor grant message to the UE; and after receiving the second floor grant message, the UE notifies the talker that the talker can talk.

Optionally, a message type of the second floor grant message may be a floor grant message in the RTCP.

Optionally, after sending the first floor grant message to the media resource function entity, the MCPTT server may notify another member in the group to which the talker belongs that the talker is granted the floor.

According to the floor control method provided in at least one of Embodiments 1 to 3 of the present invention, a control plane and a media plane of a PTT service can be separated, and transmission information on a control plane for floor control and a floor application procedure method are defined. This helps a control plane function entity and a media plane function entity to separately perform subsequent technology evolution. In addition, configuration may be flexibly performed at a service layer, and a service feature may be flexibly defined, so that a service is flexibly implemented. This also helps system extension.

Figure 4:
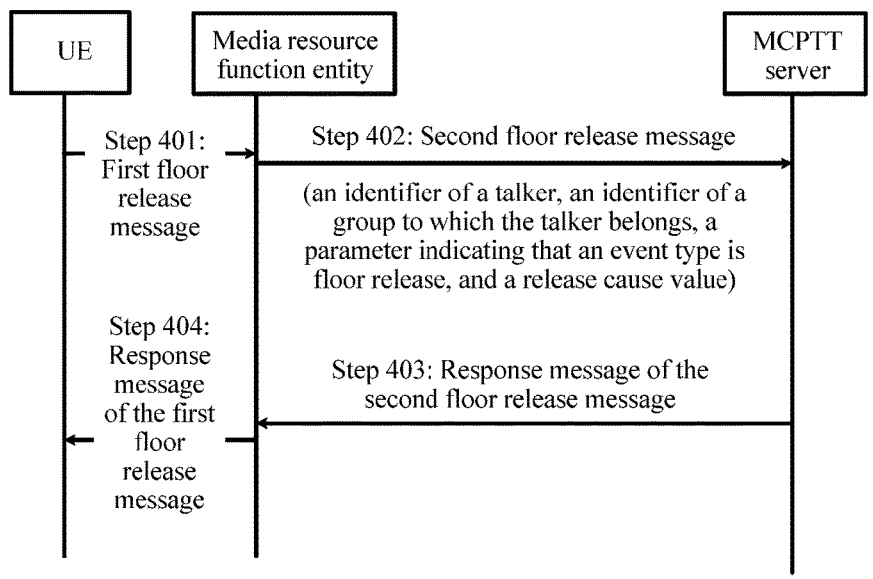
FIG. 4 is a flowchart 4 of another floor control method according to an embodiment.

Embodiment 4 of the present invention is described in detail in the following by using FIG. 4 as an example. This embodiment of the present invention provides a floor control method, the method is specifically a floor release procedure, and the method includes the following steps.

Step 401: A talker releases a PTT key of UE, and the UE sends a first floor release message to a media resource function entity, where the first floor release message includes an identity of the talker, an identifier of a group to which the talker belongs, a parameter indicating that an event type is floor release, and a release cause value.

Optionally, a message type of the first floor release message may be a floor release message in the RTCP.

Step 402: The media resource function entity generates a second floor release message according to the first floor release message, where the second floor release message includes the identity of the talker, the identifier of the group to which the talker belongs, the parameter indicating that an event type is floor release, and the release cause value; and the media resource function entity sends the second floor release message to a MCPTT server.

Optionally, a message type of the second floor release message may be a floor release message in the RTCP.

Step 403: The MCPTT server generates, according to the second floor release message, a response message in response to the second floor release message.

Optionally, a message type of the response message of the second floor release message may be a floor release OK message in the RTCP.

Preferably, after according to the second floor release message, checking a status of the group to which the talker belongs and/or refreshing a status of the group to which the talker belongs, the MCPTT server determines to grant the talker a floor, and then generates the response message in response to the second floor release message. The checking a status of the group to which the talker belongs may include: checking whether the floor is held in the group. The refreshing a status of the group to which the talker belongs may include: determining a specific user in the group who holds the floor.

The MCPTT server sends, to the media resource function entity, the response message in response to the second floor release message.

Step 404: The media resource function entity generates a response message of the first floor release message according to the response message in response to the second floor release message, and the media resource function entity sends the response message of the first floor release message to the UE.

Optionally, the response message of the first floor release message may be a floor release OK message in the RTCP.

Optionally, after the MCPTT server sends, to the media resource function entity, the response message in response to the second floor release message, the MCPTT server may notify another member in the group to which the talker belongs that the floor of the talker is released.

Figure 5:
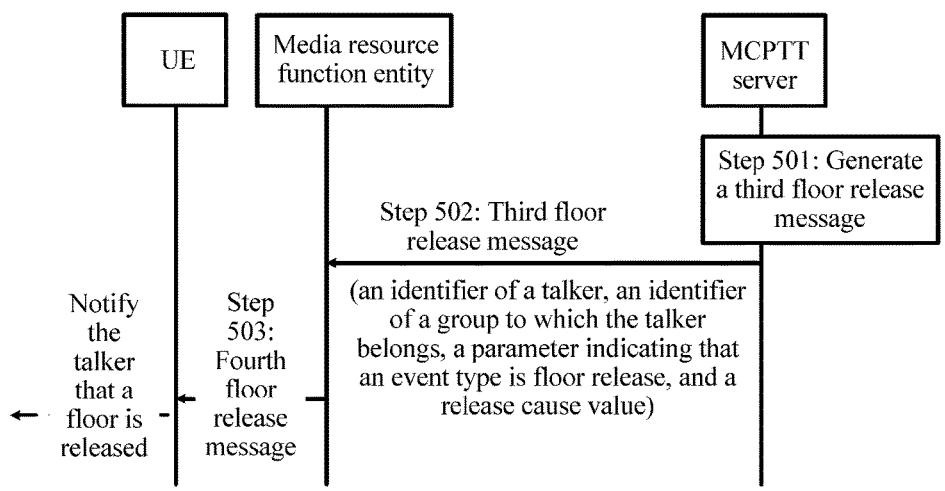
FIG. 5 is a flowchart 5 of another floor control method according to an embodiment.

Embodiment 5 of the present invention is described in detail in the following by using FIG. 5 as an example. This embodiment of the present invention provides another floor release procedure, and the method includes the following steps.

Step 501: An MCPTT server determines to release a floor of a talker, and generates a third floor release message, where the third floor release message includes an identity of the talker, an identifier of a group to which the talker belongs, a parameter indicating that an event type is floor release, and a release cause value.

Optionally, a message type of the third floor release message may be a floor release message in the RTCP.

Step 502: The MCPTT server sends the third floor release message to a media resource function entity, where the third floor release message is used to instruct the media resource function entity to generate a fourth floor release message.

Step 503: The media resource function entity generates the fourth floor release message according to the third floor release message, where the fourth floor release message includes the identity of the talker, the identifier of the group to which the talker belongs, the parameter indicating that an event type is floor release, and the release cause value; and the media resource function entity sends the fourth floor release message to UE. Optionally, after receiving the fourth floor release message, the UE notifies the talker that the floor is released.

Optionally, a message type of the fourth floor release message may be a floor release message in the RTCP.

The foregoing embodiment may further include the following step: The media resource function entity generates a response message of the third floor release message according to the third floor release message, and the media resource function entity sends the response message of the third floor release message to the MCPTT server. This step may be performed before step 503, or may be performed after step 503.

Optionally, a message type of the response message of the third floor release message may be a floor release OK message in the RTCP.

Optionally, the foregoing method may further include the following step: After the MCPTT server receives the response message that is of the third floor release message and that is sent by the media resource function entity, the MCPTT server may notify another member in the group to which the talker belongs that the floor of the talker is released.

According to the floor control method provided in at least one of Embodiment 4 or 5 of the present invention, a control plane and a media plane of a PTT service can be separated, and transmission information on a control plane for floor control and a floor release procedure method are defined. This helps a control plane function entity and a media plane function entity to separately perform subsequent technology evolution. In addition, configuration may be flexibly performed at a service layer, and a service feature may be flexibly defined, so that a service is flexibly implemented. This also helps system extension.

Figure 6:
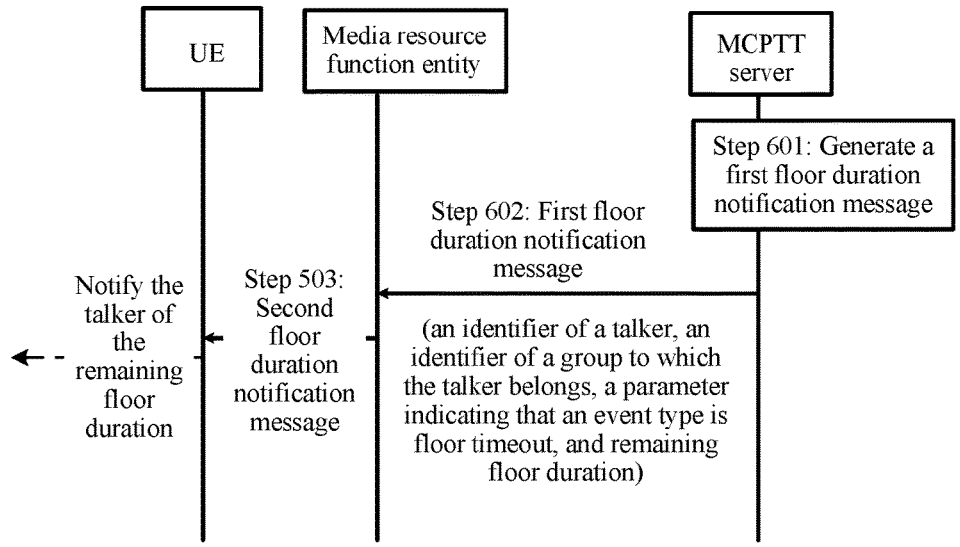
FIG. 6 is a flowchart 6 of another floor control method according to an embodiment.

Embodiment 6 of the present invention is described in detail in the following by using FIG. 6 as an example. This embodiment of the present invention provides a floor duration notification procedure, and the method includes the following steps.

Step 601: An MCPTT server determines that a talker needs to be notified of remaining floor duration, and generates a first floor duration notification message, where the first floor duration notification message includes an identity of the talker, an identifier of a group to which the talker belongs, a parameter indicating that an event type is floor timeout, and the remaining floor duration.

Specifically, that the MCPTT server determines that a talker needs to be notified of remaining floor duration may be a timer is configured in the MCPTT server. A timing time of the timer may be a time obtained by subtracting one minute from floor duration of the talker. When the timer expires, the MCPTT server is triggered to generate the first floor duration notification message.

Step 602: The MCPTT server sends the first floor duration notification message to a media resource function entity, where the first floor duration notification message is used to instruct the media resource function entity to send a second floor duration notification message to UE, and the second floor duration notification message is used to instruct the UE to prompt for a floor time limit status of the talker.

Step 603: The media resource function entity receives the first floor duration notification message, and generates the second floor duration notification message according to the first floor duration notification message, where the second floor duration notification message includes the identity of the talker, the identifier of the group to which the talker belongs, the parameter indicating that an event type is floor timeout, and the remaining floor duration; and the media resource function entity sends the second floor duration notification message to the UE.

After receiving the second floor duration notification message, the UE notifies the talker of the remaining floor duration. Likewise, referring to the example in step 601, the remaining floor duration may be one minute.

According to the floor control method provided in Embodiment 6 of the present invention, a control plane and a media plane of a PTT service can be separated, and transmission information on a control plane for floor control and a floor release procedure method are defined. This helps a control plane function entity and a media plane function entity to separately perform subsequent technology evolution. In addition, configuration may be flexibly performed at a service layer, and a service feature may be flexibly defined, so that a service is flexibly implemented. This also helps system extension.

Figure 7:
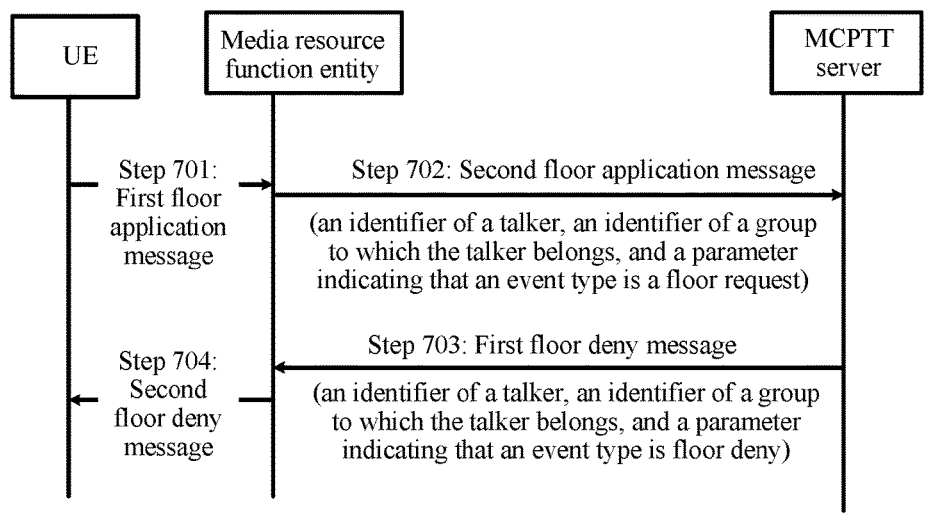
FIG. 7 is a flowchart 7 of another floor control method according to an embodiment.

Embodiment 7 of the present invention is described in detail in the following by using FIG. 7 as an example. This embodiment of the present invention provides a floor deny procedure, and the method includes the following steps.

Step 701: A talker presses a PTT key of user equipment user equipment (UE), and the UE sends a first floor application message to a media resource function (Media Resource Function) entity, where the first floor application message includes an identity of the talker (talker ID), an identifier of a group (Group ID) to which the talker belongs, and a parameter indicating that an event type is a floor request (floor request). Optionally, a message type of the first floor application message may be a floor request message in the Real-Time Control Protocol (RTCP).

Step 702: The media resource function entity generates a second floor application message according to the first floor application message, where the second floor application message includes the identity of the talker (talker ID), the identifier of the group (group ID) to which the talker belongs, and the parameter indicating that the event type is a floor request (floor request); and then, the media resource function entity sends the second floor application message to an MCPTT server. Optionally, a message type of the second floor application message may be a floor request message in the Real-Time Control Protocol (RTCP).

Step 703: The MCPTT server receives the second floor application message, and determines to deny granting the talker a floor; the MCPTT server generates, according to the second floor application message, a first floor deny message in response to the second floor application message, where the first floor deny message includes the identity of the talker, the identifier of the group to which the talker belongs, a parameter indicating that an event type is floor deny (floor deny), and a deny cause value; and the MCPTT server sends the first floor deny message to the media resource function entity. Optionally, a message type of the first floor deny message may be a floor deny message in the RTCP.

Preferably, the MCPTT server may determine, according to the second floor application message and a floor control policy, to deny granting the talker the floor. The floor control policy includes at least one of a status of the group to which the talker belongs, a user priority, a user floor control right, or a current floor queue status.

That it is determined, according to the user priority, to deny granting the talker the floor may be:

If it is determined that a user priority of the talker is lower than that of a current floor holder or does not meet a floor grant standard, granting of the floor to the talker is denied.

That it is determined, according to the user floor control right, to deny granting the talker the floor may be, if it is determined that the talker does not have a user floor right, granting of the floor to the talker is denied.

That it is determined, according to the status of the group to which the talker belongs, to deny granting the talker the floor may be:

Whether currently there is a user in the group who holds the floor is checked; if currently there is a floor holder, granting of the floor to the talker is denied after it is determined that a user priority of the talker is lower than that of the current floor holder or that the talker does not have a user floor right (for example, the talker is in a blacklist); or if currently there is no floor holder, granting of the floor to the talker is denied after it is determined that the talker does not have a user floor right (for example, the talker is in a blacklist).

That it is determined, according to the current floor queue status, to deny granting the talker the floor may be, if it is determined, according to a priority of the talker, that there is a need to perform floor priority queuing, it is determined to deny granting the talker the floor.

Step 704: The media resource function entity receives the first floor deny message, and generates a second floor deny message according to the first floor deny message, where the second floor deny message includes the identity of the talker, the identifier of the group to which the talker belongs, the parameter indicating that an event type is floor deny, and the deny cause value; the media resource function entity sends the second floor deny message to the UE; and after receiving the second floor deny message, the UE notifies the talker that the floor is denied. Optionally, a message type of the second floor deny message may be a floor deny message in the RTCP.

According to the floor control method provided in Embodiment 7 of the present invention, a control plane and a media plane of a PTT service can be separated, and transmission information on a control plane for floor control and a floor deny procedure method are defined. This helps a control plane function entity and a media plane function entity to separately perform subsequent technology evolution. In addition, configuration may be flexibly performed at a service layer, and a service feature may be flexibly defined, so that a service is flexibly implemented. This also helps system extension.

Figure 8:
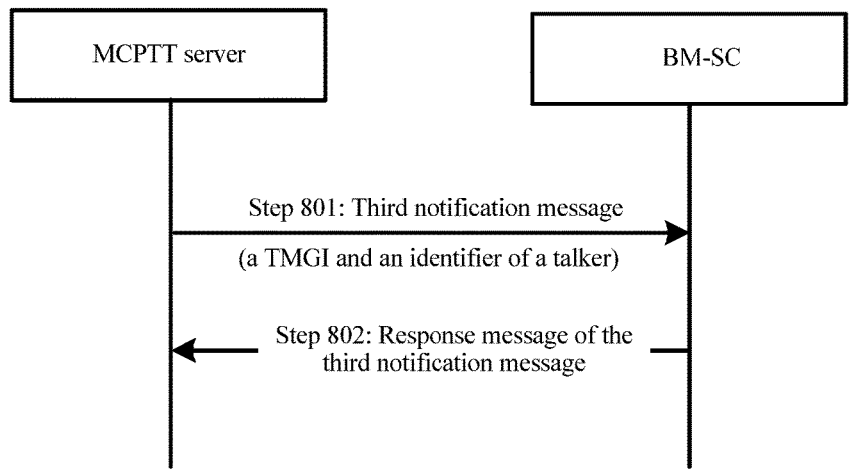
FIG. 8 is a flowchart 8 of another floor control method according to an embodiment.

Embodiment 8 of the present invention is described in detail in the following by using FIG. 8 as an example. This embodiment of the present invention provides a method for notifying, in a multicast manner, another member in a group to which a talker belongs, and the method includes the following steps:

Step 801: An MCPTT server sends a third notification message to a broadcast/multicast service center (BM-SC), where the third notification message includes a temporary mobile group identity (TMGI) and an identity of the talker, and the third notification message is used to instruct the BM-SC to notify, by using a multicast channel, a device used by another member, except the talker, that is in a multicast area and that is in a group to which the talker belongs of information indicating that a floor of the talker is granted or information indicating that a floor is released.

Step 802: The BM-SC sends a response message of the third notification message to the MCPTT server.

After step 802, the BM-SC notifies, by using the multicast channel, the device used by the another member, except the talker, that is in the multicast area and that is in the group to which the talker belongs of the information indicating that the floor of the talker is granted or the information indicating that the floor is released.

If this embodiment is used to notify, after a floor release procedure, the device used by the another member, except the talker, that is in the multicast area and that is in the group to which the talker belongs of the information indicating that the floor of the talker is released, the third notification message is used to instruct the BM-SC to notify, by using the multicast channel, the device used by the another member, except the talker, that is in the multicast area and that is in the group to which the talker belongs of the information indicating that the floor of the talker is released. In addition, the identity of the talker is a preset value. Optionally, the preset value may be all zeros or all ones.

Before step 801, this embodiment may further include the following step: The MCPTT server determines that the talker successfully applies for the floor or that the floor is released. Specifically, after the MCPTT server receives a second floor application message, the MCPTT server determines to grant the talker the floor, and the MCPTT server may perform step 801 after determining to grant the talker the floor. Alternatively, after the MCPTT server receives a second floor application message, the MCPTT server determines to deny granting the talker the floor, and the MCPTT server may perform step 801 after determining to deny granting the talker the floor. Step 801 may be performed after or before a response message of a second floor release message is sent to a media resource function entity. The MCPTT server may perform step 801 after receiving a response message that is of a third floor release message and that is sent by the media resource function entity, or may perform step 801 after generating a third floor release message and before receiving a response message that is of the third floor release message and that is sent by the media resource function entity.

Figure 9:
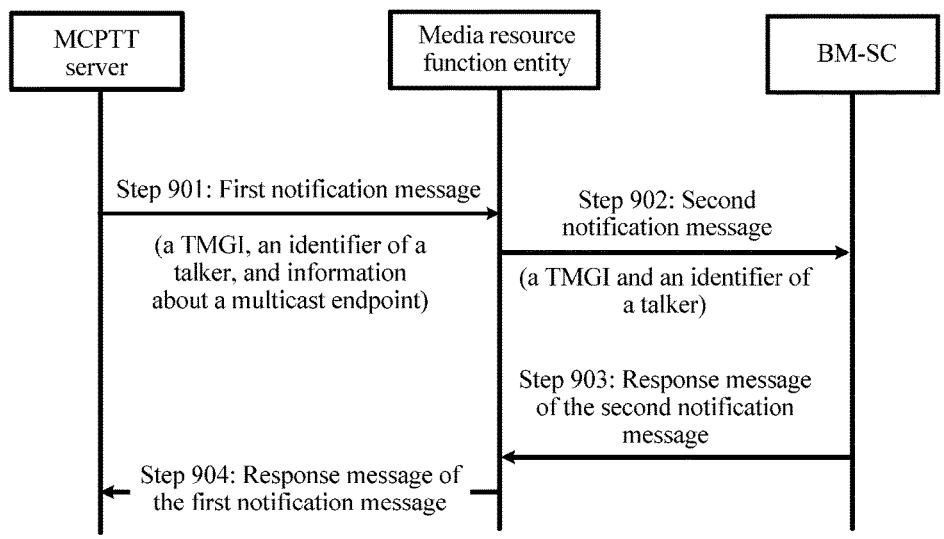
FIG. 9 is a flowchart 9 of another floor control method according to an embodiment.

Embodiment 9 of the present invention is described in detail in the following by using FIG. 9 as an example. This embodiment of the present invention provides another method for notifying, in a multicast manner, another member in a group to which a talker belongs, and the method includes the following steps:

Step 901: A MCPTT server sends, at a multicast endpoint, a first notification message to a media resource function entity, where the first notification message includes a temporary mobile group identity (TMGI), an identity of the talker, and multicast endpoint information, and the first notification message is used to instruct the media resource function entity to notify, by using a broadcast/multicast service center (BM-SC), a device used by another member, except the talker, that is in a multicast area and that is in a group to which the talker belongs of information indicating that a floor of the talker is granted or information indicating that a floor is released.

Step 902: After receiving the first notification message, the media resource function entity generates a second notification message according to the first notification message, and sends the second notification message to the BM-SC by using the multicast endpoint, where the second notification message includes the TMGI and the identity of the talker, and the second notification message is used to instruct the BM-SC to notify, by using a multicast channel, the device used by the another member, except the talker, that is in the multicast area and that is in the group to which the talker belongs of the information indicating that the floor of the talker is granted or the information indicating that the floor is released.

Step 903: The BM-SC generates a response message of the second notification message according to the second notification message, and sends, to the media resource function entity, the response message in response to the second notification message.

Step 904: The media resource function entity generates a response message of the first notification message according to the response message of the second notification message, and the media resource function entity sends the response message of the first notification message to the MCPTT server.

If this embodiment is used to notify, after a floor release procedure, the device used by the another member, except the talker, that is in the multicast area and that is in the group to which the talker belongs of the information indicating that the floor of the talker is released, the first notification message is used to instruct the BM-SC to notify, by using the multicast channel, the device used by the another member, except the talker, that is in the multicast area and that is in the group to which the talker belongs of the information indicating that the floor of the talker is released. In addition, the identity of the talker is a preset value. Optionally, the preset value may be all zeros or all ones.

Before step 901, this embodiment may further include the following step: The MCPTT server determines that the talker successfully applies for the floor or that the floor is released. Specifically, after the MCPTT server receives a second floor application message, the MCPTT server determines to grant the talker the floor, and the MCPTT server may perform step 901 after determining to grant the talker the floor. Alternatively, after the MCPTT server receives a second floor application message, the MCPTT server determines to deny granting the talker the floor, and the MCPTT server may perform step 901 after determining to deny granting the talker the floor. Step 901 may be performed after or before a response message of a second floor release message is sent to the media resource function entity. The MCPTT server may perform step 901 after receiving a response message that is of a third floor release message and that is sent by the media resource function entity, or may perform step 901 after generating a third floor release message and before receiving a response message that is of the third floor release message and that is sent by the media resource function entity.

Figure 10:
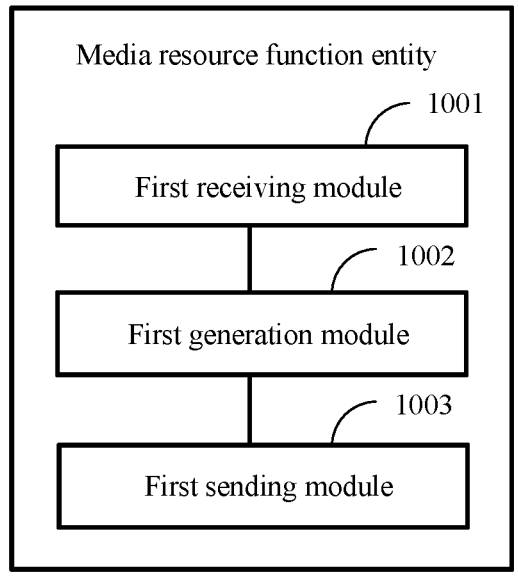
FIG. 10 is a structural diagram of a media resource function entity according to an embodiment.

Embodiment 10 of the present invention is described in detail in the following by using FIG. 10 as an example. This embodiment of the present invention provides a floor control apparatus, the apparatus may be a media resource function Media Resource Function entity, and the apparatus includes: a first receiving module 1001, a first generation module 1002, and a first sending module 1003.

The first receiving module 1001 is configured to receive a first floor application message sent by user equipment (UE), where the first floor application message includes an identity of a talker, an identifier of a group to which the talker belongs, and a parameter indicating that an event type is a floor request.

Optionally, the first floor application message may be a floor request message in the Real-Time Control Protocol (RTCP).

The first generation module 1002 is configured to generate a second floor application message according to the first floor application message received by the first receiving module 1001, where the second floor application message includes the identity of the talker, the identifier of the group to which the talker belongs, and the parameter indicating that the event type is a floor request.

Optionally, a message type of the second floor application message may be a floor request message in the RTCP.

The first sending module 1003 is configured to send, to a mission-critical push-to-talk (MCPTT) server over Long Term Evolution network, the second floor application message generated by the first generation module 1002.

The first receiving module 1001 is further configured to receive a first floor grant message that is in response to the second floor application message and that is sent by the MCPTT server, where the first floor grant message includes the identity of the talker, the identifier of the group to which the talker belongs, and a parameter indicating that an event type is a floor grant.

Optionally, a message type of the first floor grant message may be a floor grant message in the RTCP.

The first generation module 1002 is further configured to generate a second floor grant message according to the first floor grant message, where the second floor grant message includes the identity of the talker, the identifier of the group to which the talker belongs, and the parameter indicating that an event type is a floor grant.

Optionally, a message type of the second floor grant message may be a floor grant message in the RTCP.

The first sending module 1003 is further configured to send, to the UE, the second floor grant message generated by the first generation module.

This embodiment describes a structure and functions of a media resource function entity applied to a floor application procedure. For details, refer to Embodiment 3.

The media resource function entity may further have the following structure and/or functions:

In an embodiment, the media resource function entity may be further applied to a floor release procedure. Further, refer to Embodiment 4.

The first receiving module is further configured to receive a first floor release message sent by the UE, where the first floor release message includes the identity of the talker, the identifier of the group to which the talker belongs, a parameter indicating that an event type is floor release, and a release cause value.

Optionally, a message type of the first floor release message may be a floor release message in the RTCP.

The first generation module is further configured to generate a second floor release message according to the first floor release message received by the first receiving module, where the second floor release message includes the identity of the talker, the identifier of the group to which the talker belongs, the parameter indicating that an event type is floor release, and the release cause value.

Optionally, a message type of the second floor release message may be a floor release message in the RTCP.

The first sending module is further configured to send, to the MCPTT server, the second floor release message generated by the first generation module.

The first receiving module is further configured to receive a response message that is in response to the second floor release message and that is sent by the MCPTT server.

Optionally, a message type of the response message of the second floor release message may be a floor release OK message in the RTCP.

The first generation module is further configured to generate a response message of the first floor release message according to the response message that is in response to the second floor release message and that is received by the first receiving module.

The first sending module is further configured to send, to the UE, the response message that is of the first floor release message and that is generated by the first generation module.

Optionally, the response message of the first floor release message may be a floor release OK message in the RTCP.

It should be noted that this embodiment may be combined with the foregoing other embodiments, for example, combined with at least one of the embodiment of floor release, floor duration notification, or notification by using a multicast channel, so as to form a media resource function entity having at least one of a function of floor release, floor duration notification, or user floor information notification by using a multicast channel, and a floor application function. Alternatively, this embodiment may be an independent embodiment, that is, form a media resource function entity having only a floor release function. When this embodiment is an independent embodiment, description about functions of functional parts should be changed from "further configured to" into "configured to."

In an embodiment, the media resource function entity may be further applied to a floor release procedure. Further, refer to Embodiment 5.

The first receiving module is further configured to receive a third floor release message sent by the MCPTT server, where the third floor release message includes the identity of the talker, the identifier of the group to which the talker belongs, a parameter indicating that an event type is floor release, and a release cause value.

Optionally, a message type of the third floor release message may be a floor release message in the RTCP.

The first generation module is further configured to generate a response message of the third floor release message according to the third floor release message received by the first receiving module.

The first sending module is further configured to send, to the MCPTT server, the response message that is of the third floor release message and that is generated by the first generation module.

The first generation module is further configured to generate a fourth floor release message according to the third floor release message generated by the first receiving module, where the fourth floor release message includes the identity of the talker, the identifier of the group to which the talker belongs, the parameter indicating that an event type is floor release, and the release cause value.

The first sending module is further configured to send, to the UE, the fourth floor release message generated by the first generation module.

Optionally, a message type of the fourth floor release message may be a floor release message in the RTCP.

In an embodiment, the media resource function entity may be further applied to a floor release procedure. Further, refer to Embodiment 5.

The first receiving module is further configured to receive a third floor release message sent by the MCPTT server, where the third floor release message includes the identity of the talker, the identifier of the group to which the talker belongs, a parameter indicating that an event type is floor release, and a release cause value.

Optionally, a message type of the third floor release message may be a floor release message in the RTCP.

The first generation module is further configured to: generate a response message of the third floor release message according to the third floor release message received by the first receiving module, and generate a fourth floor release message according to the third floor release message, where the fourth floor release message includes the identity of the talker, the identifier of the group to which the talker belongs, the parameter indicating that an event type is floor release, and the release cause value.

Optionally, the response message of the third floor release message may be a floor release OK message in the RTCP.

Optionally, a message type of the fourth floor release message may be a floor release message in the RTCP.

The first sending module is further configured to: send, to the MCPTT server, the response message that is of the third floor release message and that is generated by the first generation module, and send the fourth floor release message to the UE.

It should be noted that this embodiment may be combined with the foregoing other embodiments, for example, combined with the embodiments of floor application, floor duration notification, and notification by using a multicast channel, so as to form a media resource function entity having functions of floor application, floor duration notification, and notification by using a multicast channel. Alternatively, this embodiment may be an independent embodiment, that is, form a media resource function entity having only a floor release function. When this embodiment is an independent embodiment, description about functions of functional parts should be changed from "further configured to" into "configured to."

In an embodiment, the media resource function entity may be further applied to a case in which another member in the group to which the talker belongs is notified, by using a multicast channel, of information indicating that a floor of the talker is granted. Further, refer to Embodiment 9.

The first receiving module is further configured to receive, at a multicast endpoint, a first notification message sent by the MCPTT server, where the first notification message includes a temporary mobile group identity TMGI, the identity of the talker, and multicast endpoint information.

The first generation module is further configured to generate a second notification message according to the first notification message received by the first receiving module, where the second notification message includes the TMGI and the identity of the talker.

The first sending module is further configured to send, to a broadcast/multicast service center BM-SC, the second notification message generated by the first generation module, where the second notification message is used to instruct the BM-SC to notify, by using a multicast channel, a device used by another member, except the talker, that is in a multicast area and that is in the group to which the talker belongs of information indicating that a floor of the talker is granted or information indicating that a floor is released.

The first receiving module is further configured to receive a response message that is in response to the second notification message and that is sent by the BM-SC.

The first generation module is further configured to generate a response message of the first notification message according to the response message that is of the second notification message and that is received by the first receiving module.

The first sending module is further configured to send, to the MCPTT server, the response message that is of the first notification message and that is generated by the first generation module.

It should be noted that this embodiment may be combined with the foregoing other embodiments, for example, combined with the embodiment of floor application, and then optionally combined with the embodiments of floor release and floor duration notification, so as to form a media resource function entity having functions of floor application and notification by using a multicast channel and optionally having functions of floor release and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to."

In an embodiment, the media resource function entity may be further applied to a case in which another member in the group to which the talker belongs is notified, by using a multicast channel, of information indicating that a floor of the talker is released. Further, refer to Embodiment 9.

The first receiving module is further configured to receive, at a multicast endpoint, a first notification message sent by the MCPTT server, where the first notification message includes a temporary mobile group identity (TMGI), the identity of the talker, and multicast endpoint information.

The first generation module is further configured to generate a second notification message according to the first notification message received by the first receiving module, where the second notification message includes the TMGI and the identity of the talker.

The first sending module is further configured to send, to a broadcast/multicast service center (BM-SC), the second notification message generated by the first generation module, where the second notification message is used to instruct the BM-SC to notify, by using a multicast channel, a device used by another member, except the talker, that is in a multicast area and that is in the group to which the talker belongs of information indicating that a floor of the talker is granted or information indicating that a floor is released.

The first receiving module is further configured to receive a response message that is in response to the second notification message and that is sent by the BM-SC.

The first generation module is further configured to generate a response message of the first notification message according to the response message that is of the second notification message and that is received by the first receiving module.

The first sending module is further configured to send, to the MCPTT server, the response message that is of the first notification message and that is generated by the first generation module.

The identity of the talker is a preset value.

Optionally, the preset value may be all zeros or all ones.

It should be noted that this embodiment may be combined with the foregoing other embodiments, for example, combined with the embodiment of floor release, and then optionally combined with the embodiments of floor application and floor duration notification, so as to form a media resource function entity having functions of floor release and notification by using a multicast channel and optionally having functions of floor application and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to."

In an embodiment, the media resource function entity may be further applied to a floor duration notification procedure. Further, refer to Embodiment 6.

The first receiving module is further configured to receive a first floor duration notification message sent by the MCPTT server, where the first floor duration notification message includes the identity of the talker, the identifier of the group to which the talker belongs, a parameter indicating that an event type is floor timeout, and remaining floor duration.

The first generation module is further configured to generate a second floor duration notification message according to the first floor duration notification message received by the first receiving module, where the second floor duration notification message includes the identity of the talker, the identifier of the group to which the talker belongs, the parameter indicating that an event type is floor timeout, and the remaining floor duration.

The first sending module is further configured to send, to the UE, the second floor duration notification message generated by the first generation module, where the second floor duration notification message is used to instruct the UE to prompt for a floor time limit status of the talker.

It should be noted that this embodiment may be combined with the foregoing other embodiments, for example, combined with at least one of the embodiment of floor application or floor release, and optionally combined with the embodiment of notification by using a multicast channel, so as to form a media resource function entity having at least one of a function of floor application or floor release and a function of remaining floor time notification and optionally having a function of notification by using a multicast channel. Alternatively, this embodiment may be an independent embodiment, that is, form a media resource function entity having only a function of remaining floor time notification. When this embodiment is an independent embodiment, description about functions of functional parts should be changed from "further configured to" into "configured to."

Figure 11:
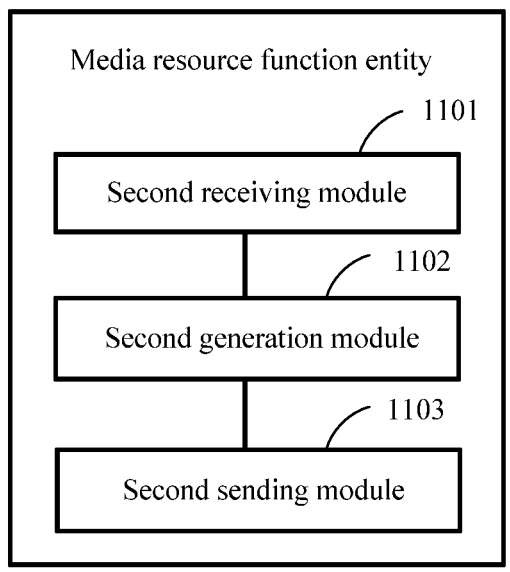
FIG. 11 is a structural diagram of another media resource function entity according to an embodiment.

Embodiment 11 of the present invention is described in detail in the following by using FIG. 11 as an example. This embodiment of the present invention provides a floor control apparatus, the apparatus may be a media resource function Media Resource Function entity, and the apparatus includes: a second receiving module 1101, a second generation module 1102, and a second sending module 1103.

The second receiving module 1101 is configured to receive a first floor application message sent by user equipment UE, where the first floor application message includes an identity of a talker, an identifier of a group to which the UE belongs, and a parameter indicating that an event type is a floor request.

Optionally, a message type of the first floor application message may be a floor request message in the Real-Time Control Protocol (RTCP).

The second generation module 1102 is configured to generate a second floor application message according to the first floor application message received by the second receiving module 1101, where the second floor application message includes the identity of the talker, the identifier of the group to which the UE belongs, and the parameter indicating that the event type is a floor request.

Optionally, a message type of the second floor application message may be a floor request message in the Real-Time Control Protocol (RTCP).

The second sending module 1103 is configured to send, to a mission-critical push-to-talk MCPTT server over Long Term Evolution network, the second floor application message generated by the second generation module 1102.

The second receiving module 1101 is further configured to receive a first floor deny message that is in response to the second floor application message and that is sent by the MCPTT server, where the first floor deny message includes the identity of the talker, the identifier of the group to which the UE belongs, a parameter indicating that an event type is floor deny, and a deny cause value.

Optionally, a message type of the first floor deny message may be a floor deny message in the RTCP.

The second generation module 1102 is further configured to generate a second floor deny message according to the first floor deny message received by the second receiving module 1101, where the second floor deny message includes the identity of the talker, the identifier of the group to which the UE belongs, the parameter indicating that an event type is floor deny, and the deny cause value.

Optionally, a message type of the second floor deny message may be a floor deny message in the RTCP.

The second sending module 1103 is further configured to send, to the UE, the second floor deny message generated by the second generation module 1102.

Figure 12:
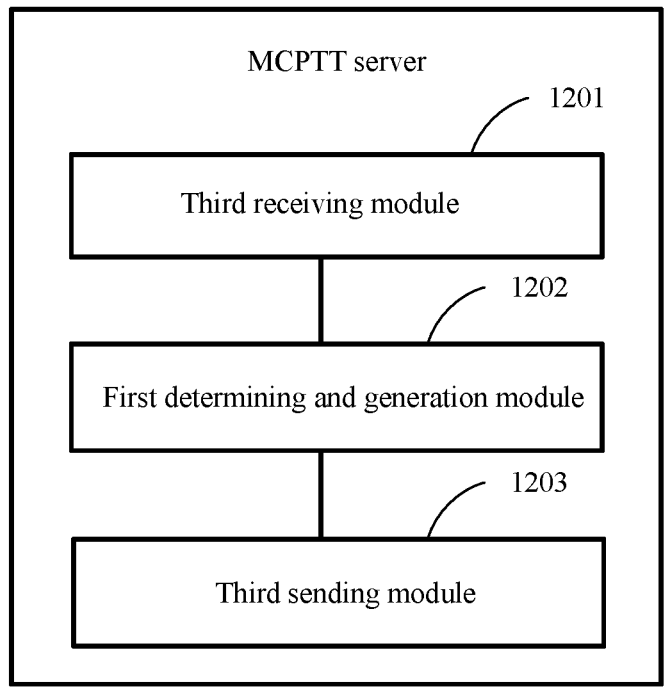

Embodiment 12 of the present invention is described in detail in the following by using FIG. 12 as an example. This embodiment of the present invention provides an apparatus used in a floor application procedure, and the apparatus may be a mission-critical push-to-talk (MCPTT) server over Long Term Evolution network. Further, refer to Embodiment 9. The apparatus includes: a third receiving module 1201, a first determining and generation module 1202, and a third sending module 1203.

The third receiving module 1201 is configured to receive a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request.

Optionally, a message type of the first floor application message may be a floor request message in the Real-Time Control Protocol (RTCP).

Optionally, a message type of the second floor application message may be a floor request message in the Real-Time Control Protocol (RTCP).

The first determining and generation module 1202 is configured to: determine, according to a floor control policy and the second floor application message, to grant the talker a floor, and generate, according to the second floor application message, a first floor grant message in response to the second floor application message, where the first floor grant message includes the identity of the talker, the identifier of the group to which the talker belongs, and a parameter indicating that an event type is a floor grant.

Optionally, a message type of the first floor grant message may be a floor grant message in the RTCP.

The floor control policy includes at least one of a status of the group to which the talker belongs, a user priority, a user floor control right, or a current floor queue status.

That it is determined, according to the user priority, to grant the talker the floor may be, if it is determined that a user priority of the talker is higher than that of a current floor holder or meets a floor grant standard, the floor is granted to the talker.

That it is determined, according to the user floor control right, to grant the talker the floor may be, if it is determined that the talker has a user floor right, the floor is granted to the talker.

That it is determined, according to the status of the group to which the talker belongs, to grant the talker the floor may be whether currently there is a user in the group who holds the floor is checked; if currently there is a floor holder, there is a need to grant the talker the floor after it is determined that a user priority of the talker is higher than that of the current floor holder and that the talker has a user floor right (for example, the talker is not in a blacklist); or if currently there is no floor holder, the floor is granted to the talker after it is determined that the talker has a user floor right (for example, the talker is not in a blacklist).

That it is determined, according to the current floor queue status, to grant the talker the floor may be, if it is determined, according to a priority of the talker, that there is no need to perform floor priority queuing, it is determined to grant the talker the floor; or if it is determined, according to a priority of the talker, that there is a need to perform floor priority queuing, it is determined to grant the talker the floor after the talker queues for a period of time.

The third sending module 1203 is configured to send the first floor grant message to the media resource function entity, where the first floor grant message is used to instruct the media resource function entity to generate a second floor grant message, and send the second floor grant message to the UE, and the second floor grant message includes the identity of the talker, the identifier of the group to which the talker belongs, and the parameter indicating that an event type is a floor grant.

Optionally, a message type of the second floor grant message may be a floor grant message in the RTCP.

Optionally, after sending the first floor grant message to the media resource function entity, the apparatus may notify another member in the group to which the talker belongs that the talker is granted the floor.

According to the floor control method provided in at least one of Embodiments 1 to 3 of the present invention, a control plane and a media plane of a PTT service can be separated, and transmission information on a control plane for floor control and a floor application procedure method are defined. This helps a control plane function entity and a media plane function entity to separately perform subsequent technology evolution. In addition, configuration may be flexibly performed at a service layer, and a service feature may be flexibly defined, so that a service is flexibly implemented. This also helps system extension.

In an embodiment, the MCPTT server may be further applied to a floor release procedure. Further, refer to Embodiment 4.

The third receiving module is further configured to receive a second floor release message sent by the media resource function entity, where the second floor release message includes the identity of the talker, the identifier of the group to which the talker belongs, a parameter indicating that an event type is floor release, and a release cause value, the second floor release message is generated by the media resource function entity according to a first floor release message sent by the UE, and the first floor release message includes the identity of the talker, the identifier of the group to which the talker belongs, the parameter indicating that an event type is floor release, and the release cause value.

Optionally, a message type of the second floor release message may be a floor release message in the RTCP.

Optionally, a message type of the first floor release message may be a floor release message in the RTCP.

The third generation module is further configured to generate, according to the second floor release message, a response message in response to the second floor release message.

Preferably, after according to the second floor release message, checking a status of the group to which the talker belongs and/or refreshing a status of the group to which the talker belongs, the MCPTT server determines to grant the talker the floor, and then generates the response message in response to the second floor release message. The checking a status of the group to which the talker belongs may include checking whether the floor is held in the group. The refreshing a status of the group to which the talker belongs may include determining a specific user in the group who holds the floor.

The third sending module is further configured to send, to the media resource function entity, the response message in response to the second floor release message, where the response message in response to the second floor release message is used to instruct the media resource function entity to generate a response message of the first floor release message according to the response message of the second floor release message, and send the response message of the first floor release message to the UE.

Optionally, a message type of the response message of the second floor release message may be a floor release OK message in the RTCP.

Optionally, the response message of the first floor release message may be a floor release OK message in the RTCP.

Optionally, after the apparatus sends, to the media resource function entity, the response message in response to the second floor release message, the apparatus may notify another member in the group to which the talker belongs that the floor of the talker is released.

It should be noted that this embodiment may be combined with the foregoing other embodiments, for example, combined with the embodiments of floor application, floor duration notification, and notification by using a multicast channel, so as to form a media resource function entity having functions of floor application, floor duration notification, and notification by using a multicast channel. Alternatively, this embodiment may be an independent embodiment, that is, form a media resource function entity having only a floor release function. When this embodiment is an independent embodiment, description about functions of functional parts should be changed from "further configured to" into "configured to."

In an embodiment, the MCPTT server may be further applied to a floor release procedure. Further, refer to Embodiment 5.

The first determining and generation module is further configured to determine to release the floor of the talker, and generate a third floor release message, where the third floor release message includes the identity of the talker, the identifier of the group to which the talker belongs, a parameter indicating that an event type is floor release, and a release cause value.

The third sending module is further configured to send the third floor release message to the media resource function entity, where the third floor release message is used to instruct the media resource function entity to generate a fourth floor release message, and send the fourth floor release message to the UE, and the fourth floor release message includes the identity of the talker, the identifier of the group to which the talker belongs, the parameter indicating that an event type is floor release, and the release cause value.

Optionally, a message type of the third floor release message may be a floor release message in the RTCP.

The third receiving module is further configured to receive a response message that is in response to the third floor release message and that is sent by the media resource function entity.

Optionally, a message type of the response message of the third floor release message may be a floor release OK message in the RTCP.

It should be noted that this embodiment may be combined with the foregoing other embodiments, for example, combined with the embodiments of floor application, floor duration notification, and notification by using a multicast channel, so as to form a media resource function entity having functions of floor application, floor duration notification, and notification by using a multicast channel. Alternatively, this embodiment may be an independent embodiment, that is, form a media resource function entity having only a floor release function. When this embodiment is an independent embodiment, description about functions of functional parts should be changed from "further configured to" into "configured to."

In an embodiment, the MCPTT server may be further applied to a case in which another member in the group to which the talker belongs is notified of information about the floor of the talker by using a multicast channel. Further, refer to Embodiment 8.

The third sending module is further configured to send a third notification message to a broadcast/multicast service center (BM-SC), where the third notification message includes a temporary mobile group identity (TMGI) and the identity of the talker, and the third notification message is used to instruct the BM-SC to notify, by using a multicast channel, a device used by another member, except the talker, that is in a multicast area and that is in the group to which the talker belongs of information indicating that the floor of the talker is granted or information indicating that the floor is released.

The third receiving module is further configured to receive a response message that is of the third notification message and that is sent by the BM-SC.

It should be noted that this embodiment may be combined with the foregoing other embodiments, for example, combined with the embodiment of floor release, and then optionally combined with the embodiments of floor application and floor duration notification, so as to form a media resource function entity having functions of floor release and notification by using a multicast channel and optionally having functions of floor application and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to."

In an embodiment, the MCPTT server may be further applied to a case in which another member in the group to which the talker belongs is notified of information about the floor of the talker by using a multicast channel. Further, refer to Embodiment 8.

The third sending module is further configured to send a third notification message to a broadcast/multicast service center (BM-SC), where the third notification message includes a temporary mobile group identity (TMGI) and the identity of the talker, and the third notification message is used to instruct the BM-SC to notify, by using a multicast channel, a device used by another member, except the talker, that is in a multicast area and that is in the group to which the talker belongs of information indicating that the floor of the talker is granted or information indicating that the floor is released.

The third receiving module is further configured to receive a response message that is of the third notification message and that is sent by the BM-SC.

The identity of the talker is a preset value.

Optionally, the preset value may be all zeros or all ones.

It should be noted that this embodiment may be combined with the foregoing other embodiments, for example, combined with the embodiment of floor release, and then optionally combined with the embodiments of floor application and floor duration notification, so as to form a media resource function entity having functions of floor release and notification by using a multicast channel and optionally having functions of floor application and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to."

In an embodiment, the MCPTT server may be further applied to a case in which another member in the group to which the talker belongs is notified of information about the floor of the talker by using a multicast channel. Further, refer to Embodiment 9.

The third sending module is further configured to send, at a multicast endpoint, a first notification message to the media resource function entity, where the first notification message includes a temporary mobile group identity TMGI, the identity of the talker, and multicast endpoint information, and the first notification message is used to instruct the media resource function entity to notify, by using a broadcast/multicast service center BM-SC, a device used by another member, except the talker, that is in a multicast area and that is in the group to which the talker belongs of information indicating that the floor of the talker is granted.

The third receiving module is further configured to receive, at the multicast endpoint, a response message that is of the first notification message and that is sent by the media resource function entity.

It should be noted that this embodiment may be combined with the foregoing other embodiments, for example, combined with the embodiment of floor application, and then optionally combined with the embodiments of floor release and floor duration notification, so as to form a media resource function entity having functions of floor release and notification by using a multicast channel and optionally having functions of floor application and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to."

In an embodiment, the MCPTT server may be further applied to a case in which another member in the group to which the talker belongs is notified of information about the floor of the talker by using a multicast channel. Further, refer to Embodiment 9.

The third sending module is further configured to send, at a multicast endpoint, a first notification message to the media resource function entity, where the first notification message includes a temporary mobile group identity TMGI, the identity of the talker, and multicast endpoint information, and the first notification message is used to instruct the media resource function entity to notify, by using a broadcast/multicast service center BM-SC, a device used by another member, except the talker, that is in a multicast area and that is in the group to which the talker belongs of information indicating that the floor of the talker is released.

The third receiving module is further configured to receive, at the multicast endpoint, a response message that is of the first notification message and that is sent by the media resource function entity.

The identity of the talker is a preset value.

Optionally, the preset value may be all zeros or all ones.

It should be noted that this embodiment may be combined with the foregoing other embodiments, for example, combined with the embodiment of floor release, and then optionally combined with the embodiments of floor application and floor duration notification, so as to form a media resource function entity having functions of floor release and notification by using a multicast channel and optionally having functions of floor application and floor duration notification. Alternatively, this embodiment may be an independent embodiment, that is, form a media resource function entity having only a function of notification by using a multicast channel. When this embodiment is an independent embodiment, description about functions of functional parts should be changed from "further configured to" into "configured to."

In an embodiment, the MCPTT server may be further applied to a case in which another member in the group to which the talker belongs is notified of information about the floor of the talker by using a multicast channel. Further, refer to Embodiment 6.

The first determining and generation module is further configured to: determine that the talker needs to be notified of remaining floor duration, and generate a first floor duration notification message, where the first floor duration notification message includes the identity of the talker, the identifier of the group to which the talker belongs, a parameter indicating that an event type is floor timeout, and the remaining floor duration.

The third sending module is further configured to send the first floor duration notification message to the media resource function entity, where the first floor duration notification message is used to instruct the media resource function entity to send a second floor duration notification message to the UE, and the second floor duration notification message is used to instruct the UE to prompt for a floor time limit status of the talker.

It should be noted that this embodiment may be combined with the foregoing other embodiments, for example, combined with at least one of the embodiment of floor application or floor release, and optionally combined with the embodiment of notification by using a multicast channel, so as to form a media resource function entity having at least one of a function of floor application or floor release and a function of remaining floor time notification and optionally having a function of notification by using a multicast channel. Alternatively, this embodiment may be an independent embodiment, that is, form a media resource function entity having only a function of remaining floor time notification. When this embodiment is an independent embodiment, description about functions of functional parts should be changed from "further configured to" into "configured to."

It should be noted that the foregoing method embodiments or apparatus embodiments may be combined, or may be independent from each other. For example, the foregoing floor application may be an independent embodiment, or may be combined with other different embodiments to be one embodiment. For example, a talker may first successfully apply for a floor by using a floor application procedure, and receive floor duration notification information by using a floor duration notification procedure. Then the floor is successfully released by using a floor release procedure. A manner of combining other embodiments is similar to this. During the floor application procedure or the floor release procedure, another member in a group to which the talker belongs may be notified, in a manner of notification by using a multicast channel in the foregoing embodiments, of information indicating that the floor of the talker is granted or released.

Figure 13:
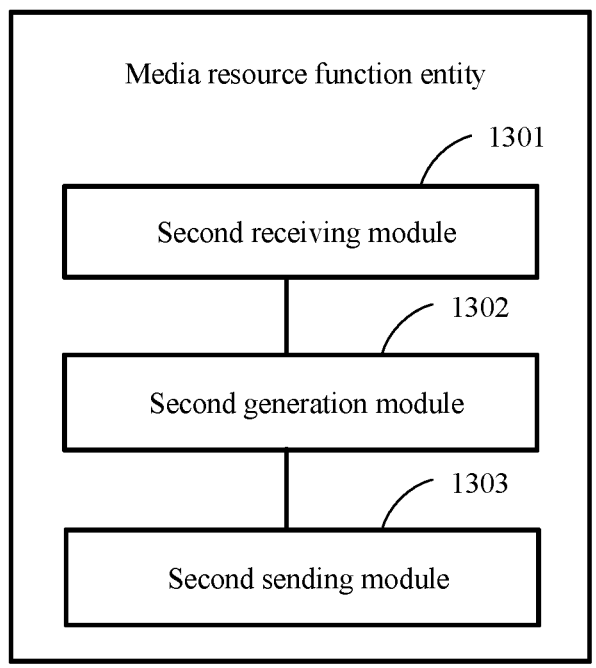
FIG. 13 is a structural diagram of another media resource function entity according to an embodiment.

Embodiment 13 of the present invention is described in detail in the following by using FIG. 13 as an example. This embodiment of the present invention provides a floor control apparatus, the apparatus may be a media resource function Media Resource Function entity, and the apparatus includes a second receiving module 1301, a second generation module 1302, and a second sending module 1303.

The second receiving module 1301 is configured to receive a first floor application message sent by user equipment UE, where the first floor application message includes an identity of a talker, an identifier of a group to which the UE belongs, and a parameter indicating that an event type is a floor request.

Optionally, a message type of the first floor application message may be a floor request message in the Real-Time Control Protocol (RTCP) protocol.

The second generation module 1302 is configured to generate a second floor application message according to the first floor application message received by the second receiving module 1301, where the second floor application message includes the identity of the talker, the identifier of the group to which the UE belongs, and the parameter indicating that the event type is a floor request.

Optionally, a message type of the second floor application message may be a floor request message in the RTCP.

The second sending module 1303 is configured to send, to a mission-critical push-to-talk MCPTT server over Long Term Evolution network, the second floor application message generated by the second generation module 1302.

The second receiving module 1301 is further configured to receive a first floor deny message that is in response to the second floor application message and that is sent by the MCPTT server, where the first floor deny message includes the identity of the talker, the identifier of the group to which the UE belongs, a parameter indicating that an event type is floor deny, and a deny cause value.

Optionally, a message type of the first floor deny message may be a floor deny message in the RTCP.

The second generation module 1302 is further configured to generate a second floor deny message according to the first floor deny message received by the second receiving module 1301, where the second floor deny message includes the identity of the talker, the identifier of the group to which the UE belongs, the parameter indicating that an event type is floor deny, and the deny cause value.

Optionally, a message type of the second floor deny message may be a floor deny message in the RTCP.

The second sending module 1303 is further configured to send, to the UE, the second floor deny message generated by the second generation module 1302.

Figure 14:
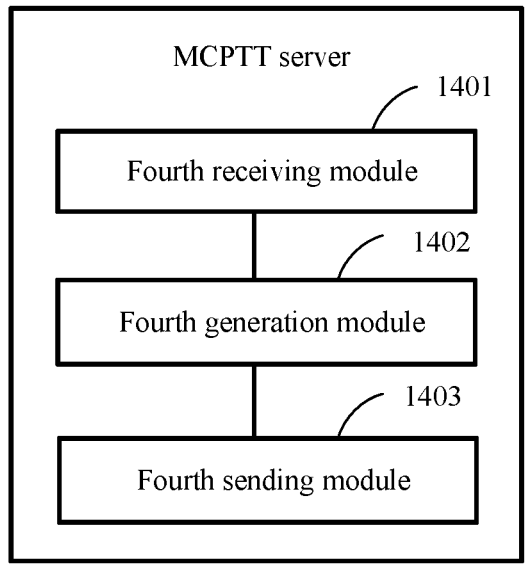
FIG. 14 is a structural diagram of another MCPTT server according to an embodiment.

Embodiment 14 of the present invention is described in detail in the following by using FIG. 14 as an example. This embodiment of the present invention provides a floor control apparatus, the apparatus may be an MCPTT server, and the apparatus includes a fourth receiving module 1401, a fourth generation module 1402, and a fourth sending module 1403.

The fourth receiving module 1401 is configured to receive a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request.

Optionally, a message type of the first floor application message may be a floor request message in the Real-Time Control Protocol (RTCP).

Optionally, a message type of the second floor application message may be a floor request message in the RTCP (Real-Time Control Protocol, Real-Time Control Protocol) protocol.

The fourth generation module 1402 is configured to generate a first floor deny message according to the second floor application message and a floor control policy, where the first floor deny message includes the identity of the talker, the identifier of the group to which the talker belongs, a parameter indicating that an event type is floor deny, and a deny cause value.

Optionally, a message type of the first floor deny message may be a floor deny message in the RTCP.

The floor control policy includes at least one of a status of the group to which the talker belongs, a user priority, a user floor control right, or a current floor queue status.

That it is determined, according to the user priority, to deny granting the talker a floor may be, if it is determined that a user priority of the talker is lower than that of a current floor holder or does not meet a floor grant standard, granting of the floor to the talker is denied.

That it is determined, according to the user floor control right, to deny granting the talker a floor may be, if it is determined that the talker does not have a user floor right, granting of the floor to the talker is denied.

That it is determined, according to the status of the group to which the talker belongs, to deny granting the talker a floor may be whether currently there is a user in the group who holds the floor is checked; if currently there is a floor holder, granting of the floor to the talker is denied after it is determined that a user priority of the talker is lower than that of the current floor holder or that the talker does not have a user floor right (for example, the talker is in a blacklist); or if currently there is no floor holder, granting of the floor to the talker is denied after it is determined that the talker does not have a user floor right (for example, the talker is in a blacklist).

That it is determined, according to the current floor queue status, to deny granting the talker a floor may be, if it is determined, according to a priority of the talker, that there is a need to perform floor priority queuing, it is determined to deny granting the talker the floor.

The fourth sending module 1403 is configured to send the first floor deny message to the media resource function entity, where the first floor deny message is used to instruct the media resource function entity to generate a second floor deny message according to the first floor deny message, and send the second floor deny message to the UE, and the second floor deny message includes the identity of the talker, the identifier of the group to which the talker belongs, the parameter indicating that an event type is floor deny, and the deny cause value.

Optionally, a message type of the second floor deny message may be a floor deny message in the RTCP.

Figure 15:
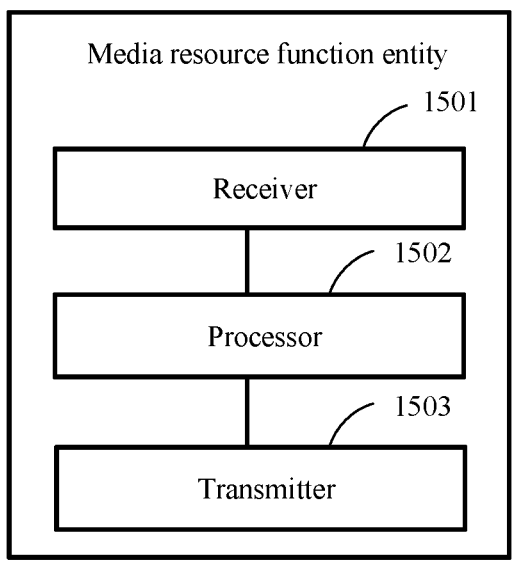
FIG. 15 is a structural diagram of another media resource function entity according to an embodiment.

Embodiment 15 of the present invention is described in detail in the following by using FIG. 15 as an example. This embodiment of the present invention provides a floor control apparatus, the apparatus may be a media resource function Media Resource Function entity, and the apparatus includes a receiver 1501, a processor 1502, and a transmitter 1503.

The receiver 1501 is configured to receive a first floor application message sent by user equipment UE, where the first floor application message includes an identity of a talker, an identifier of a group to which the talker belongs, and a parameter indicating that an event type is a floor request.

Optionally, a message type of the first floor application message may be a floor request message in the Real-Time Control Protocol (RTCP).

The processor 1502 is configured to generate a second floor application message according to the first floor application message received by the receiver 1501, where the second floor application message includes the identity of the talker, the identifier of the group to which the talker belongs, and the parameter indicating that the event type is a floor request.

Optionally, a message type of the second floor application message may be a floor request message in the Real-Time Control Protocol (RTCP).

The transmitter 1503 is configured to send, to a mission-critical push-to-talk MCPTT server over Long Term Evolution network, the second floor application message generated by the processor 1502.

The receiver 1501 is further configured to receive a first floor grant message that is in response to the second floor application message and that is sent by the MCPTT server, where the first floor grant message includes the identity of the talker, the identifier of the group to which the talker belongs, and a parameter indicating that an event type is a floor grant.

Optionally, a message type of the first floor grant message may be a floor grant message in the RTCP.

The processor 1502 is further configured to generate a second floor grant message according to the first floor grant message, where the second floor grant message includes the identity of the talker, the identifier of the group to which the talker belongs, and the parameter indicating that an event type is a floor grant.

Optionally, a message type of the second floor grant message may be a floor grant message in the RTCP.

The transmitter 1503 is further configured to send, to the UE, the second floor grant message generated by the processor 1502.

This embodiment describes a structure and functions of a media resource function entity applied to a floor application procedure. For details, refer to Embodiment 3.

Figure 16:
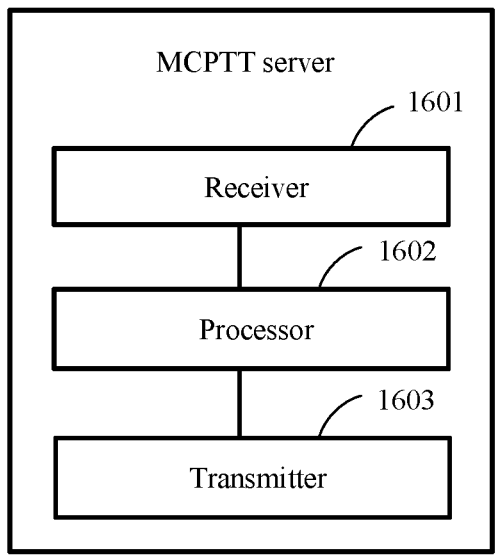
FIG. 16 is a structural diagram of another MCPTT server according to an embodiment.

Embodiment 16 of the present invention is described in detail in the following by using FIG. 16 as an example. This embodiment of the present invention provides a floor control apparatus, the apparatus may be an MCPTT server, and the apparatus includes a receiver 1601, a processor 1602, and a transmitter 1603.

The receiver 1601 is configured to receive a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request.

Optionally, the first floor application message may be a floor request message in the Real-Time Control Protocol (RTCP).

Optionally, a message type of the second floor application message may be a floor request message in the RTCP.

The processor 1602 is configured to determine, according to a floor control policy and the second floor application message, to grant the talker a floor, and generate, according to the second floor application message, a first floor grant message in response to the second floor application message, where the first floor grant message includes the identity of the talker, the identifier of the group to which the talker belongs, and a parameter indicating that an event type is a floor grant.

Optionally, a message type of the first floor grant message may be a floor grant message in the RTCP.

The floor control policy includes at least one of a status of the group to which the talker belongs, a user priority, a user floor control right, or a current floor queue status.

That it is determined, according to the user priority, to grant the talker the floor may be, if it is determined that a user priority of the talker is higher than that of a current floor holder or meets a floor grant standard, the floor is granted to the talker.

That it is determined, according to the user floor control right, to grant the talker the floor may be, if it is determined that the talker has a user floor right, the floor is granted to the talker.

That it is determined, according to the status of the group to which the talker belongs, to grant the talker the floor may be whether currently there is a user in the group who holds the floor is checked; if currently there is a floor holder, there is a need to grant the talker the floor after it is determined that a user priority of the talker is higher than that of the current floor holder and that the talker has a user floor right (for example, the talker is not in a blacklist); or if currently there is no floor holder, the floor is granted to the talker after it is determined that the talker has a user floor right (for example, the talker is not in a blacklist).

That it is determined, according to the current floor queue status, to grant the talker the floor may be, if it is determined, according to a priority of the talker, that there is no need to perform floor priority queuing, it is determined to grant the talker the floor; or if it is determined, according to a priority of the talker, that there is a need to perform floor priority queuing, it is determined to grant the talker the floor after the talker queues for a period of time.

The transmitter 1603 is configured to send the first floor grant message to the media resource function entity, where the first floor grant message is used to instruct the media resource function entity to generate a second floor grant message, and send the second floor grant message to the UE, and the second floor grant message includes the identity of the talker, the identifier of the group to which the talker belongs, and the parameter indicating that an event type is a floor grant.

Optionally, a message type of the second floor grant message may be a floor grant message in the RTCP.

This embodiment describes a structure and functions of an MCPTT server applied to a floor application procedure. For details, refer to Embodiment 3.

Figure 17:
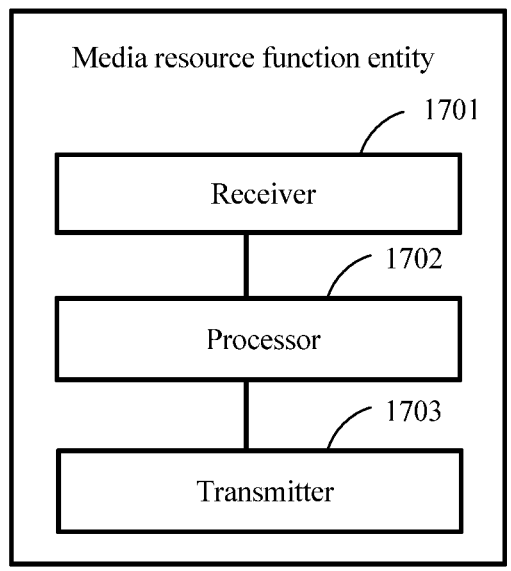
FIG. 17 is a structural diagram of another media resource function entity according to an embodiment.

Embodiment 17 of the present invention is described in detail in the following by using FIG. 17 as an example. This embodiment of the present invention provides a floor control apparatus, the apparatus may be a media resource function Media Resource Function entity, and the apparatus includes a receiver 1701, a processor 1702, and a transmitter 1703.

The receiver 1701 is configured to receive a first floor application message sent by user equipment UE, where the first floor application message includes an identity of a talker, an identifier of a group to which the UE belongs, and a parameter indicating that an event type is a floor request.

Optionally, a message type of the first floor application message may be a floor request message in the RTCP.

The processor 1702 is configured to generate a second floor application message according to the first floor application message received by the receiver 1701, where the second floor application message includes the identity of the talker, the identifier of the group to which the UE belongs, and the parameter indicating that the event type is a floor request.

Optionally, a message type of the second floor application message may be a floor request message in the RTCP.

The transmitter 1703 is configured to send, to a mission-critical push-to-talk MCPTT server over Long Term Evolution network, the second floor application message generated by the processor 1702.

The receiver 1701 is further configured to receive a first floor deny message that is in response to the second floor application message and that is sent by the MCPTT server, where the first floor deny message includes the identity of the talker, the identifier of the group to which the UE belongs, a parameter indicating that an event type is floor deny, and a deny cause value.

Optionally, a message type of the first floor deny message may be a floor deny message in the RTCP.

The processor 1702 is further configured to generate a second floor deny message according to the first floor deny message received by the second receiving module, where the second floor deny message includes the identity of the talker, the identifier of the group to which the UE belongs, the parameter indicating that an event type is floor deny, and the deny cause value.

Optionally, a message type of the second floor deny message may be a floor deny message in the RTCP.

The transmitter 1703 is further configured to send, to the UE, the second floor deny message generated by the second generation module.

This embodiment describes a structure and functions of an MCPTT server applied to a floor deny procedure. For details, refer to Embodiment 7.

Figure 18:
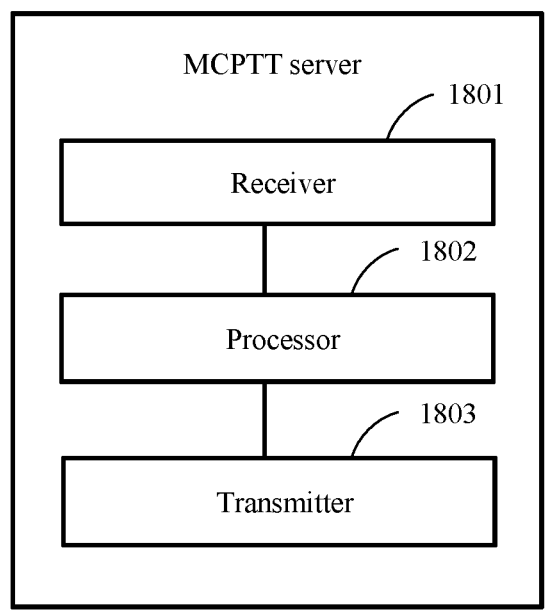
FIG. 18 is a structural diagram of another MCPTT server according to an embodiment.

Embodiment 18 of the present invention is described in detail in the following by using FIG. 18 as an example. This embodiment of the present invention provides a floor control apparatus, the apparatus may be an MCPTT server, and the apparatus includes a receiver 1801, a processor 1802, and a transmitter 1803.

The receiver 1801 is configured to receive a second floor application message sent by a media resource function entity, where the second floor application message includes an identity of the talker, an identifier of a group to which the talker belongs, and a parameter indicating that the event type is a floor request, the second floor application message is generated by the media resource function entity according to a first floor application message sent by user equipment UE, and the first floor application message includes the identity of the talker, the identifier of the group to which the talker belongs, and the parameter indicating that an event type is a floor request.

Optionally, a message type of the second floor application message may be a floor request message in the Real-Time Control Protocol (RTCP).

Optionally, a message type of the first floor application message may be a floor request message in the Real-Time Control Protocol (RTCP).

The processor 1802 is configured to generate a first floor deny message according to the second floor application message and a floor control policy, where the first floor deny message includes the identity of the talker, the identifier of the group to which the talker belongs, a parameter indicating that an event type is floor deny, and a deny cause value.

Optionally, a message type of the first floor deny message may be a floor deny message in the RTCP.

The floor control policy includes at least one of a status of the group to which the talker belongs, a user priority, a user floor control right, or a current floor queue status.

That it is determined, according to the user priority, to deny granting the talker a floor may be, if it is determined that a user priority of the talker is lower than that of a current floor holder or does not meet a floor grant standard, granting of the floor to the talker is denied.

That it is determined, according to the user floor control right, to deny granting the talker a floor may be, if it is determined that the talker does not have a user floor right, granting of the floor to the talker is denied.

That it is determined, according to the status of the group to which the talker belongs, to deny granting the talker a floor may be whether currently there is a user in the group who holds the floor is checked; if currently there is a floor holder, granting of the floor to the talker is denied after it is determined that a user priority of the talker is lower than that of the current floor holder or that the talker does not have a user floor right (for example, the talker is in a blacklist); or if currently there is no floor holder, granting of the floor to the talker is denied after it is determined that the talker does not have a user floor right (for example, the talker is in a blacklist).

That it is determined, according to the current floor queue status, to deny granting the talker a floor may be if it is determined, according to a priority of the talker, that there is a need to perform floor priority queuing, it is determined to deny granting the talker the floor.

The transmitter 1803 is configured to send the first floor deny message to the media resource function entity, where the first floor deny message is used to instruct the media resource function entity to generate a second floor deny message according to the first floor deny message, and send the second floor deny message to the UE, and the second floor deny message includes the identity of the talker, the identifier of the group to which the talker belongs, the parameter indicating that an event type is floor deny, and the deny cause value.

Optionally, a message type of the second floor deny message may be a floor deny message in the RTCP.

This embodiment describes a structure and functions of an MCPTT server applied to a floor deny procedure. For details, refer to Embodiment 7.

For other features of the foregoing apparatus, refer to related description in the foregoing method embodiments.

A person skilled in the art should understand that module division of the apparatus is function division in the embodiments of the present invention, and actual specific structures may be obtained by splitting or combining the foregoing functional modules.

The word "receive" in the foregoing embodiments of the present invention may be understood as actively obtaining information from another unit or receiving information sent by another unit.

The sequence numbers of the foregoing embodiments of the present invention are merely for illustrative purposes, and are not intended to indicate priorities of the embodiments.

The solutions disclosed in the claims also fall within the protection scope of the embodiments of the present invention.

A person of ordinary skill in the art may understand that all or a part of processing of the foregoing method embodiments may be implemented by a program instructing relevant hardware. The program may be stored in a computer readable storage medium. When the program runs, the steps of the foregoing method embodiments are performed. The foregoing storage medium includes any medium that can store program code, such as a ROM, a RAM, a magnetic disk, or an optical disc. The foregoing relevant hardware may be various types of processors such as a Central Processing Unit (CPU).

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A floor control apparatus, wherein the apparatus comprises:
   a first receiver, configured to receive a first floor application message sent by user equipment (UE), wherein the first floor application message comprises an identity of a talker, an identifier of a group to which the talker belongs, and a first parameter indicating an event type is a floor request;
   a first generator, configured to generate a second floor application message according to the first floor application message received by the first receiver, wherein the second floor application message comprises the identity of the talker, the identifier of the group to which the talker belongs, and a second parameter indicating that the event type is a floor request; and
   a first transmitter, configured to send, to a mission-critical push-to-talk (MCPTT) server over Long Term Evolution network, the second floor application message;
   wherein the first receiver is further configured to receive a first floor grant message sent by the MCPTT server in response to the second floor application message, wherein the first floor grant message comprises the identity of the talker, the identifier of the group to which the talker belongs, and a third parameter indicating that an event type is a floor grant;
   wherein the first generator is further configured to generate a second floor grant message according to the first floor grant message, wherein the second floor grant message comprises the identity of the talker, the identifier of the group to which the talker belongs, and a fourth parameter indicating that an event type is a floor grant; and
   wherein the first transmitter is further configured to send, to the UE, the second floor grant message generated by the first generator.

2. The apparatus according to claim 1, wherein the first receiver is further configured to receive a first floor release message sent by the UE, wherein the first floor release message comprises the identity of the talker, the identifier of the group to which the talker belongs, a fifth parameter indicating that an event type is floor release, and a release cause value;
   wherein the first generator is further configured to generate a second floor release message according to the first floor release message received by the first receiver, wherein the second floor release message comprises the identity of the talker, the identifier of the group to which the talker belongs, a sixth parameter indicating that an event type is floor release, and the release cause value;
   wherein the first transmitter is further configured to send, to the MCPTT server, the second floor release message generated by the first generator;
   wherein the first receiver is further configured to receive a first response message that is in response to the second floor release message and that is sent by the MCPTT server;
   wherein the first generator is further configured to generate a second response message of the first floor release message according to the first response message that is in response to the second floor release message and that is received by the first receiver; and
   wherein the first transmitter is further configured to send, to the UE, the second response message that is of the first floor release message and that is generated by the first generator.

3. The apparatus according to claim 2, wherein the first receiver is further configured to receive, at a multicast endpoint, a third notification message sent by the MCPTT server, wherein the third notification message comprises a temporary mobile group identity (TMGI), the identity of the talker, and multicast endpoint information;
   wherein the first generator is further configured to generate a fourth notification message according to the third notification message received by the first receiver, wherein the fourth notification message comprises the TMGI and the identity of the talker;
   wherein the first transmitter is further configured to send, to a broadcast/multicast service center (BM-SC), the fourth notification message generated by the first generator, wherein the fourth notification message is used to instruct the BM-SC to notify, by using a multicast channel, a device used by another member, except the talker, that is in a multicast area and that is in the group to which the talker belongs of information indicating that a floor of the talker is released;
wherein the first receiver is further configured to receive a seventh response message that is in response to the fourth notification message and that is sent by the BM-SC;
wherein the first generator is further configured to generate an eighth response message of the first notification message according to the seventh response message that is of the fourth notification message and that is received by the first receiver;
wherein the first transmitter is further configured to send, to the MCPTT server, the fourth response message that is of the first notification message and that is generated by the first generator; and
wherein the identity of the talker is a preset value.

4. The apparatus according to claim 1, wherein the first receiver is further configured to receive a third floor release message sent by the MCPTT server, wherein the third floor release message comprises the identity of the talker, the identifier of the group to which the talker belongs, a seventh parameter indicating that an event type is floor release, and a release cause value;
wherein the first generator is further configured to generate a third response message of the third floor release message according to the third floor release message received by the first receiver;
wherein the first transmitter is further configured to send, to the MCPTT server, the third response message that is of the third floor release message and that is generated by the first generator;
wherein the first generator is further configured to generate a fourth floor release message according to the third floor release message generated by the first receiver, wherein the fourth floor release message comprises the identity of the talker, the identifier of the group to which the talker belongs, the seventh parameter indicating that an event type is floor release, and the release cause value; and
wherein the first transmitter is further configured to send, to the UE, the fourth floor release message generated by the first generator.

5. The apparatus according to claim 1, wherein the first receiver is further configured to receive a fifth floor release message sent by the MCPTT server, wherein the fifth floor release message comprises the identity of the talker, the identifier of the group to which the talker belongs, an eighth parameter indicating that an event type is floor release, and a release cause value;
wherein the first generator is further configured to generate a fourth response message of the fifth floor release message according to the fifth floor release message received by the first receiver, and generate a sixth floor release message according to the fourth floor release message, wherein the sixth floor release message comprises the identity of the talker, the identifier of the group to which the talker belongs, the eighth parameter indicating that the event type is floor release, and the release cause value; and
wherein the first transmitter is further configured to send to the MCPTT server, the fourth response message that is of the fifth floor release message and that is generated by the first generator, and send the sixth floor release message to the UE.

6. The apparatus according to claim 1, wherein the first receiver is further configured to receive, at a multicast endpoint, a first notification message sent by the MCPTT server, wherein the first notification message comprises a temporary mobile group identity (TMGI), the identity of the talker, and multicast endpoint information;
wherein the first generator is further configured to generate a second notification message according to the first notification message received by the first receiver, wherein the second notification message comprises the TMGI and the identity of the talker;
wherein the first transmitter is further configured to send, to a broadcast/multicast service center (BM-SC), the second notification message generated by the first generator, wherein the second notification message instructs the BM-SC to notify, by using a multicast channel, a device used by another member other than the talker, that is in a multicast area and that is in the group to which the talker belongs, of information indicating that a floor of the talker is granted;
wherein the first receiver is further configured to receive a fifth response message that is in response to the second notification message and that is sent by the BM-SC;
wherein the first generator is further configured to generate a sixth response message of the first notification message according to the fifth response message that is of the second notification message and that is received by the first receiver; and
wherein the first transmitter is further configured to send, to the MCPTT server, the sixth response message that is of the first notification message and that is generated by the first generator.

7. The apparatus according to claim 1, wherein the first receiver is further configured to receive a first floor duration notification message sent by the MCPTT server, wherein the first floor duration notification message comprises the identity of the talker, the identifier of the group to which the talker belongs, a ninth parameter indicating that an event type is floor timeout, and remaining floor duration;
wherein the first generator is further configured to generate a second floor duration notification message according to the first floor duration notification message received by the first receiver, wherein the second floor duration notification message comprises the identity of the talker, the identifier of the group to which the talker belongs, the ninth parameter indicating that an event type is floor timeout, and the remaining floor duration; and
wherein the first transmitter is further configured to send, to the UE, the second floor duration notification message generated by the first generator, wherein the second floor duration notification message instructs the UE to prompt for a floor time limit status of the talker.

8. The apparatus according to claim 1, wherein the apparatus comprises a media resource function entity.

9. A floor control apparatus, wherein the apparatus comprises:
a third receiver, configured to receive a second floor application message sent by a media resource function entity, wherein the second floor application message comprises an identity of a talker, an identifier of a group to which the talker belongs, and a first parameter indicating that an event type is a floor request, the second floor application message is generated by the media resource function entity according to a first floor application message sent by user equipment (UE), and the first floor application message comprises the identity of the talker, the identifier of the group to which the talker belongs, and the first parameter indicating that the event type is a floor request;
a first determining and generation module, configured to determine, according to a floor control policy and the second floor application message, to grant the talker a floor, and generate, according to the second floor application message, a first floor grant message in response to the second floor application message, wherein the first floor grant message comprises the identity of the talker, the identifier of the group to which the talker belongs, and a second parameter indicating that an event type is a floor grant; and
a third transmitter, configured to send the first floor grant message to the media resource function entity, wherein the first floor grant message is used to instruct the media resource function entity to generate a second floor grant message, and send the second floor grant message to the UE, and the second floor grant message comprises the identity of the talker, the identifier of the group to which the talker belongs, and the second parameter indicating that an event type is a floor grant.

10. The apparatus according to claim 9, wherein the apparatus further comprises a third generator;
wherein the third receiver is further configured to receive a second floor release message sent by the media resource function entity, wherein the second floor release message comprises the identity of the talker, the identifier of the group to which the talker belongs, a third parameter indicating that an event type is floor release, and a release cause value, wherein the second floor release message is generated by the media resource function entity according to a first floor release message sent by the UE, and wherein the first floor release message comprises the identity of the talker, the identifier of the group to which the talker belongs, the third parameter indicating that the event type is floor release, and the release cause value;
wherein the third generator is further configured to generate, according to the second floor release message, a first response message in response to the second floor release message; and
the third transmitter is further configured to send, to the media resource function entity, the first response message in response to the second floor release message, wherein the first response message in response to the second floor release message instructs the media resource function entity to generate a second response message of the first floor release message according to the first response message of the second floor release message, and send the second response message of the first floor release message to the UE.

11. The apparatus according to claim 10, wherein the third transmitter is further configured to send a third notification message to a broadcast/multicast service center (BM-SC), wherein the third notification message comprises a temporary mobile group identity (TMGI) and the identity of the talker, and wherein the third notification message instructs the BM-SC to notify, by using a multicast channel, a device used by another member other than the talker, that is in a multicast area and that is in the group to which the talker belongs, of information indicating that the floor of the talker is released;
wherein the third receiver is further configured to receive a fifth response message that is of the third notification message and that is sent by the BM-SC; and
wherein the identity of the talker is a preset value.

12. The apparatus according to claim 10, wherein the third transmitter is further configured to send, at a multicast endpoint, a fifth notification message to the media resource function entity, wherein the fifth notification message comprises a temporary mobile group identity (TMGI), the identity of the talker, and multicast endpoint information, and the fifth notification message instructs the media resource function entity to notify, by using a broadcast/multicast service center (BM-SC), a device used by another member other than the talker, that is in a multicast area and that is in the group to which the talker belongs, of information indicating that the floor of the talker is released;
wherein the third receiver is further configured to receive, at the multicast endpoint, a seventh response message that is of the firth notification message and that is sent by the media resource function entity; and
wherein the identity of the talker is a preset value.

13. The apparatus according to claim 9, wherein the first determining and generation module is further configured to determine to release the floor of the talker, and generate a third floor release message, wherein the third floor release message comprises the identity of the talker, the identifier of the group to which the talker belongs, a fourth parameter indicating that an event type is floor release, and a release cause value;
the third transmitter is further configured to send the third floor release message to the media resource function entity, wherein the third floor release message instructs the media resource function entity to generate a fourth floor release message, and send the fourth floor release message to the UE, and wherein the fourth floor release message comprises the identity of the talker, the identifier of the group to which the talker belongs, the fourth parameter indicating that the event type is floor release, and the release cause value; and
wherein the third receiver is further configured to receive a third response message that is in response to the third floor release message and that is sent by the media resource function entity.

14. The apparatus according to claim 9, wherein the third transmitter is further configured to send a third notification message to a broadcast/multicast service center (BM-SC), wherein the third notification message comprises a temporary mobile group identity (TMGI) and the identity of the talker, and wherein the third notification message instructs the BM-SC to notify, by using a multicast channel, a device used by another member, except the talker, that is in a multicast area and that is in the group to which the talker belongs of information indicating that the floor of the talker is granted; and
wherein the third receiver is further configured to receive a fourth response message that is of the third notification message and that is sent by the BM-SC.

15. The apparatus according to claim 9, wherein the third transmitter is further configured to send, at a multicast endpoint, a fourth notification message to the media resource function entity, wherein the fourth notification message comprises a temporary mobile group identity (TMGI), the identity of the talker, and information about the multicast endpoint, and the fourth notification message instructs the media resource function entity to notify, by using a broadcast/multicast service center BM-SC, a device used by another member other than the talker, that is in a multicast area and that is in the group to which the talker belongs, of information indicating that the floor of the talker is granted; and
wherein the third receiver is further configured to receive, at the multicast endpoint, a sixth response message that is of the fourth notification message and that is sent by the media resource function entity.

16. The apparatus according to claim 9, wherein the first determining and generation module is further configured to determine that the talker needs to be notified of remaining floor duration, and further configured to generate a first floor duration notification message, wherein the first floor duration notification message comprises the identity of the talker, the identifier of the group to which the talker belongs, a fifth parameter indicating that an event type is floor timeout, and the remaining floor duration; and the third transmitter is further configured to send the first floor duration notification message to the media resource function entity, wherein the first floor duration notification message instructs the media resource function entity to send a second floor duration notification message to the UE, and the second floor duration notification message instructs the UE to prompt for a floor time limit status of the talker.

17. The apparatus according to claim 9, wherein the apparatus is a mission-critical push-to-talk (MCPTT) server over Long Term Evolution network.

18. A floor control apparatus, wherein the apparatus comprises a fourth receiver, configured to receive a second floor application message sent by a media resource function entity, wherein the second floor application message comprises an identity of a talker, an identifier of a group to which the talker belongs, and a first parameter indicating that an event type is a floor request, wherein the second floor application message is generated by the media resource function entity according to a first floor application message sent by user equipment (UE), and wherein the first floor application message comprises the identity of the talker, the identifier of the group to which the talker belongs, and the first parameter indicating that the event type is a floor request;

a fourth generator, configured to generate a first floor deny message according to the second floor application message and a floor control policy, wherein the first floor deny message comprises the identity of the talker, the identifier of the group to which the talker belongs, a second parameter indicating that an event type is floor deny, and a deny cause value; and a fourth transmitter, configured to send the first floor deny message to the media resource function entity, wherein the first floor deny message instructs the media resource function entity to generate a second floor deny message according to the first floor deny message, and send the second floor deny message to the UE, and wherein the second floor deny message comprises the identity of the talker, the identifier of the group to which the talker belongs, the second parameter indicating that an event type is floor deny, and the deny cause value.

* * * * *